(12) United States Patent
Lunani et al.

(10) Patent No.: US 10,429,830 B2
(45) Date of Patent: Oct. 1, 2019

(54) SYSTEMS AND METHODS FOR OPTIMIZING WATER UTILITY OPERATION

(71) Applicant: Aquasight LLC, Troy, MI (US)

(72) Inventors: Mahesh Lunani, Rochester Hills, MI (US); Ravindra Nath Rapaka, Troy, MI (US)

(73) Assignee: Aquasight LLC, Troy, MI (US)

( * ) Notice: Subject to any disclaimer, the term of this patent is extended or adjusted under 35 U.S.C. 154(b) by 246 days.

(21) Appl. No.: 15/282,515

(22) Filed: Sep. 30, 2016

(65) Prior Publication Data

US 2017/0097647 A1 Apr. 6, 2017

Related U.S. Application Data

(60) Provisional application No. 62/236,307, filed on Oct. 2, 2015.

(51) Int. Cl.
| | |
|---|---|
| G05B 23/02 | (2006.01) |
| G05B 15/02 | (2006.01) |
| G05B 13/02 | (2006.01) |
| G05B 19/04 | (2006.01) |
| C02F 1/00 | (2006.01) |

(52) U.S. Cl.
CPC ............ *G05B 23/0283* (2013.01); *C02F 1/00* (2013.01); *G05B 13/02* (2013.01); *G05B 15/02* (2013.01); *G05B 19/04* (2013.01); *G05B 23/02* (2013.01); *C02F 2201/00* (2013.01); *C02F 2201/4612* (2013.01); *C02F 2203/00* (2013.01); *C02F 2209/00* (2013.01); *C02F 2301/00* (2013.01); *G05B 2219/2605* (2013.01)

(58) Field of Classification Search
None
See application file for complete search history.

(56) References Cited

U.S. PATENT DOCUMENTS

| | | | | |
|---|---|---|---|---|
| 8,920,619 | B2* | 12/2014 | Salzer | G01N 27/308 |
| | | | | 204/403.03 |
| 2013/0013259 | A1* | 1/2013 | Wolfe | G01N 33/18 |
| | | | | 702/188 |

OTHER PUBLICATIONS

Reynolds, Laurie, "Technically Speaking: Water and Internet of Things" Jun. 2, 2015 (Year: 2015).*
Zhang, Lifang, "Design of Agricultural Environmental Parameters Monitoring System based on Internet of Things" Oct. 1, 2014, Applied Mechanics and Materials, vols. 608-609, pp. 1115-1119. (Year: 2014).*

* cited by examiner

*Primary Examiner* — Qing Yuan Wu
(74) *Attorney, Agent, or Firm* — Foley & Lardner LLP; Christopher J. McKenna; Evan M. St. Jean

(57) ABSTRACT

This disclosure provides systems and methods for improving the performance of a water pumping station. A server can be configured to receive data from a plurality of sensors included within the water utility plant. The server can cleanse the data received from the water utility plant to generate cleansed data. The server can prepare the cleansed data for use by the water utility plant to generate plant-specific data. The server also can generate real-time analytic data based on the plant-specific data.

18 Claims, 25 Drawing Sheets

Data Cleansing results

| SensorID | Number of Shutdown Events | Number of Missing Rows | Number of Missing Values | Number of Negative Values | Number of Reading Spikes | KW Alignment |
|---|---|---|---|---|---|---|
| FC1 | 0 | 0 | 2 | 0 | 0 | 1165 |
| FC2 | 0 | 0 | 2 | 0 | 1 | 1207 |
| PC1 | 0 | 0 | 2 | 0 | 0 | 0 |
| PC2 | 0 | 0 | 2 | 0 | 0 | 0 |
| VV1 | 0 | 0 | 2 | 0 | 0 | 0 |
| VV2 | 0 | 0 | 2 | 0 | 0 | 0 |
| VV3 | 0 | 0 | 2 | 0 | 0 | 0 |
| VV4 | 0 | 0 | 2 | 0 | 1 | 0 |
| VA1 | 0 | 0 | 2 | 0 | 0 | 0 |
| VA2 | 0 | 0 | 2 | 0 | 0 | 0 |
| VA3 | 0 | 0 | 2 | 0 | 0 | 0 |
| VA4 | 0 | 0 | 2 | 0 | 1 | 0 |
| KW1% | 0 | 0 | 2 | 0 | 1 | 0 |
| KW2% | 0 | 0 | 2 | 0 | 0 | 0 |
| KW3% | 0 | 0 | 2 | 0 | 0 | 0 |
| KW4% | 0 | 0 | 2 | 0 | 0 | 0 |
| WW1 | 0 | 0 | 2 | 0 | 0 | 0 |
| WW2 | 0 | 0 | 2 | 0 | 0 | 0 |
| PT1 | 0 | 0 | 2 | 0 | 0 | 0 |
| PT2 | 0 | 0 | 2 | 0 | 0 | 0 |
| PT3 | 0 | 0 | 2 | 0 | 0 | 0 |
| PT4 | 0 | 0 | 2 | 0 | 0 | 0 |
| VS1 | 0 | 0 | 2 | 0 | 0 | 0 |
| VS2 | 0 | 0 | 2 | 0 | 0 | 0 |
| VS3 | 0 | 0 | 2 | 0 | 0 | 0 |
| VS4 | 0 | 0 | 2 | 0 | 1 | 0 |

FIG. 5

SYSTEMS AND METHODS FOR OPTIMIZING WATER UTILITY OPERATION

FIELD OF THE DISCLOSURE

This disclosure generally relates to providing systems and methods for optimizing water utility operation. In particular, this disclosure relates to providing an Internet of Things solution of intelligence, insights, alerts, and recommendations regarding the operation of potable and wastewater pumping stations.

BACKGROUND

Three to Five percent of energy used in the United States is devoted to pumping or otherwise moving water. Pumping systems represent up to seventy percent of this energy. Energy costs represent thirty-five percent of the water production expenses of a water utility. Most pumps waste energy 95% of the time because they are being run inefficiently. This is due in part to a lack of insight into actual operating efficiency of pumping stations. What is needed is a way to manage peak energy consumption without affecting the utility's ability to serve its customers, optimize pumping operations under actual and changing demand requirements, monitor degradation to allow for pro-active and predictive maintenance, avoid emergency repairs, and gain insight on equipment upgrades using real-life data that can be used to justify capital expenditure.

SUMMARY

The present disclosure relates generally to providing Internet of Things systems and methods for optimizing water utility operation. The systems and methods include providing intelligence, insights, alerts and recommendations for potable and waste water pumping stations. Such insights can provide 5%-30% in energy savings, improve labor efficiencies, reduce operations and management costs via predictive maintenance, avoid catastrophic and emergency repairs, and justify capital upgrades. The systems and methods can leverage existing legacy infrastructure, sensors, and variable frequency drive installations at pumping stations; can be compatible with a variety of SCADA systems; can run without additional hardware installation; can be equipment agnostic with respect to computing platforms, and can provide a single solution for both potable and waste water pumping stations; and can provide an intuitive dashboard providing intelligence and alerts, including droll down into analytical insights. The systems and methods described herein are applicable to, without limitation, both public and private water operators including municipal or public works water departments operated by city, county, state, or federal government.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 5 illustrates a an example table of data cleansing results, according to an illustrative implementation;

Figure 1A:
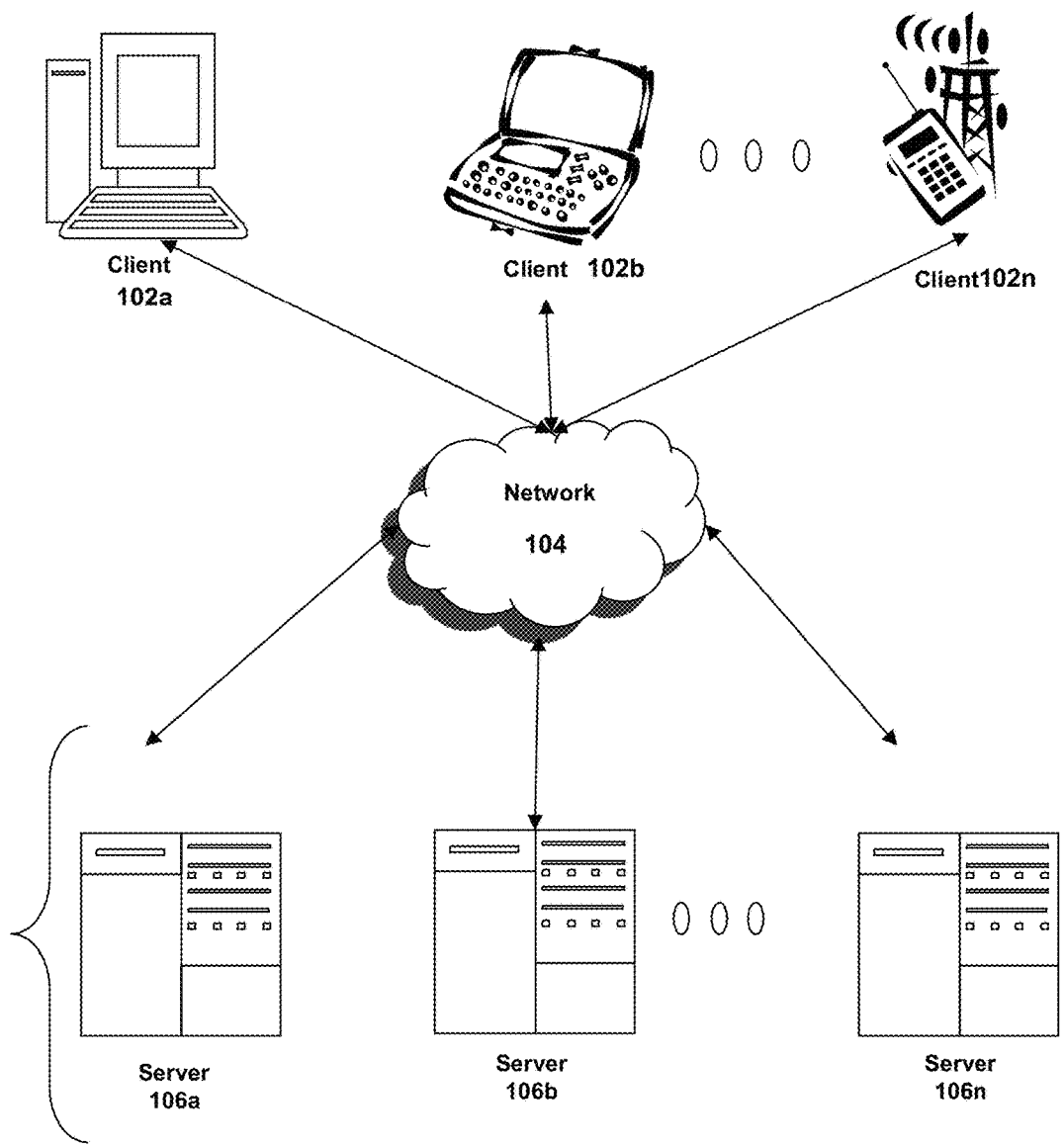
FIG. 1A is a block diagram depicting an example infrastructure for optimizing water utility operation, according to an illustrative implementation.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

Following below are more detailed descriptions of various concepts related to, and implementations of, methods, apparatuses, and systems for optimizing water utility operation using and Internet of Things based Real-Time Intelligence and Big data analytics. The various concepts introduced above and discussed in greater detail below may be implemented in any of numerous ways, as the described concepts are not limited to any particular manner of implementation.

Prior to discussing the specifics of embodiments of the systems and methods disclosed herein it may be helpful to discuss the network and computing environments in which such embodiments may be deployed. Referring to FIG. 1A, an embodiment of a network environment is depicted. In brief overview, the network environment includes one or more clients 102a-102n (also generally referred to as local machine(s) 102, computing device(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some implementations, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. The network 104 can be a local-area network (LAN), such as a company intranet, a metropolitan area network (MAN), or a wide area network (WAN), such as the Internet or the World Wide Web. In some implementations, there are multiple networks 104 between the clients 102 and the servers 106. In one of these implementations, a network 104' (not shown) may be a private network and a network 104 may be a public network. In another of these implementations, a network 104 may be a private network and a network 104' a public network. In still another of these implementations, networks 104 and 104' may both be private networks.

The network 104 may be any type and/or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some implementations, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol(s) or standard(s) used to communicate among mobile devices, including AMPS, TDMA, CDMA, GSM, GPRS, UMTS, WiMAX, 3G or 4G. In some implementations, different types of data may be transmitted via different protocols. In other implementations, the same types of data may be transmitted via different protocols.

In some implementations, the system may include multiple, logically-grouped servers 106. In one of these implementations, the logical group of servers 106 may be referred to as a server farm or a machine farm. In another of these implementations, the servers 106 may be geographically dispersed. In other implementations, a machine farm may be administered as a single entity. In still other implementations, the machine farm includes a plurality of machine farms. The servers 106 within each machine farm can be heterogeneous—one or more of the servers 106 or machines 106 can operate according to one type of operating system platform (e.g., WINDOWS, manufactured by Microsoft Corp. of Redmond, Washington), while one or more of the other servers 106 can operate on according to another type of operating system platform (e.g., Unix or Linux).

In one embodiment, servers 106 in the machine farm may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm do not need to be physically proximate to another server 106 in the same machine farm. Thus, the group of servers 106 logically grouped as a machine farm may be interconnected using a wide-area network (WAN) connection or a metropolitan-area network (MAN) connection. For example, a machine farm may include servers 106 physically located in different continents or different regions of a continent, country, state, city, campus, or room. Data transmission speeds between servers 106 in the machine farm can be increased if the servers 106 are connected using a local-area network (LAN) connection or some form of direct connection. Additionally, a heterogeneous machine farm may include one or more servers 106 operating according to a type of operating system, while one or more other servers 106 execute one or more types of hypervisors rather than operating systems. In these implementations, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the Xen hypervisor, an open source product whose development is overseen by Citrix Systems, Inc.; the Virtual Server or virtual PC hypervisors provided by Microsoft or others.

In order to manage a machine farm, at least one aspect of the performance of servers 106 in the machine farm should be monitored. Typically, the load placed on each server 106 or the status of sessions running on each server 106 is monitored. In some implementations, a centralized service may provide management for machine farm. The centralized service may gather and store information about a plurality of servers 106, respond to requests for access to resources hosted by servers 106, and enable the establishment of connections between client machines 102 and servers 106.

Management of the machine farm may be de-centralized. For example, one or more servers 106 may comprise components, subsystems and modules to support one or more management services for the machine farm. In one of these implementations, one or more servers 106 provide functionality for management of dynamic and real-time data, including techniques for handling failover, data replication and reliability, and increasing the robustness of the machine farm. Each server 106 may communicate with a persistent store and, in some implementations, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node.

In another embodiment, a plurality of nodes 290 may be in the path between any two communicating servers.

In one embodiment, the server 106 provides the functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106' hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives output data, such as display data, generated by an execution of the identified application on the server 106.

Figure 1B:
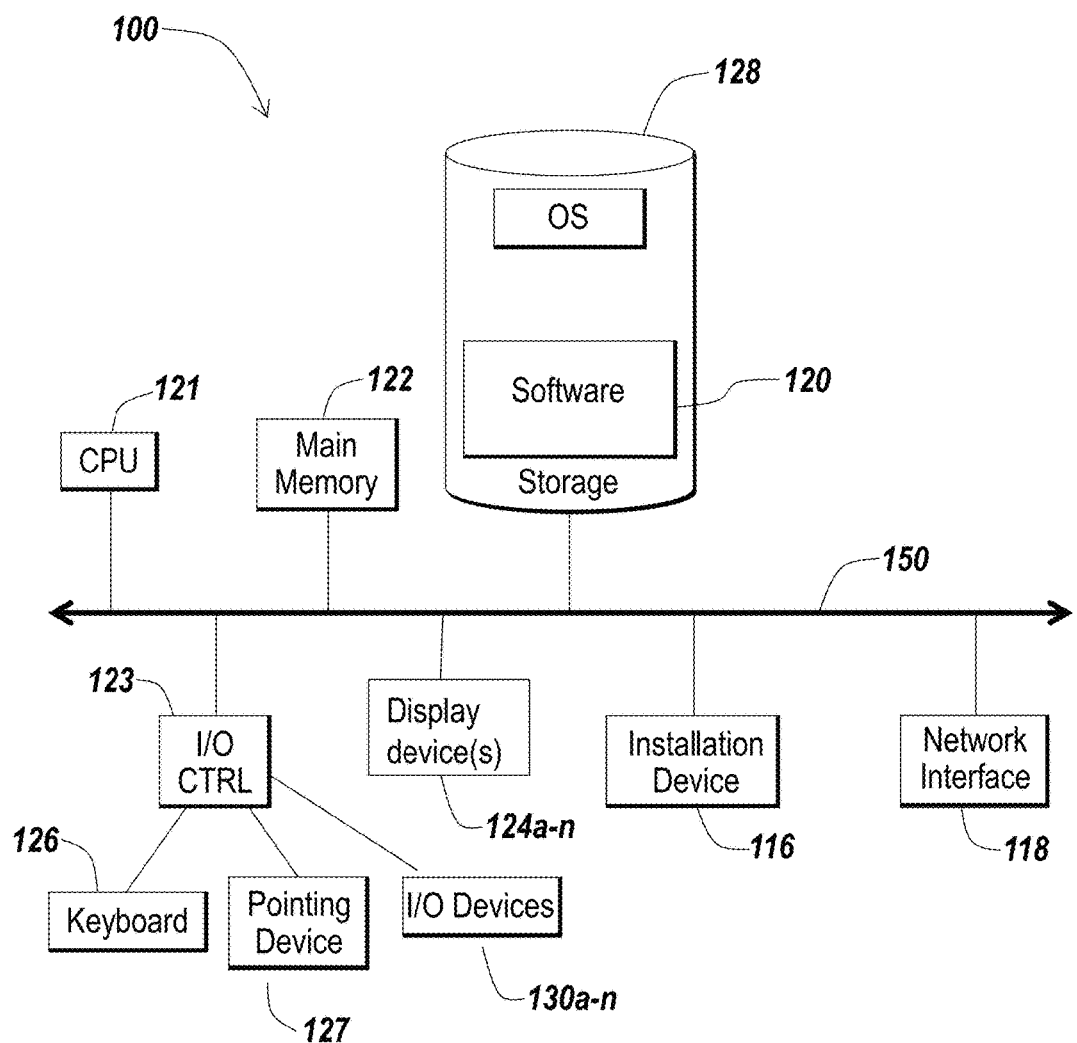
FIG. 1B is a block diagram depicting an example computing device.
Figure 1C:
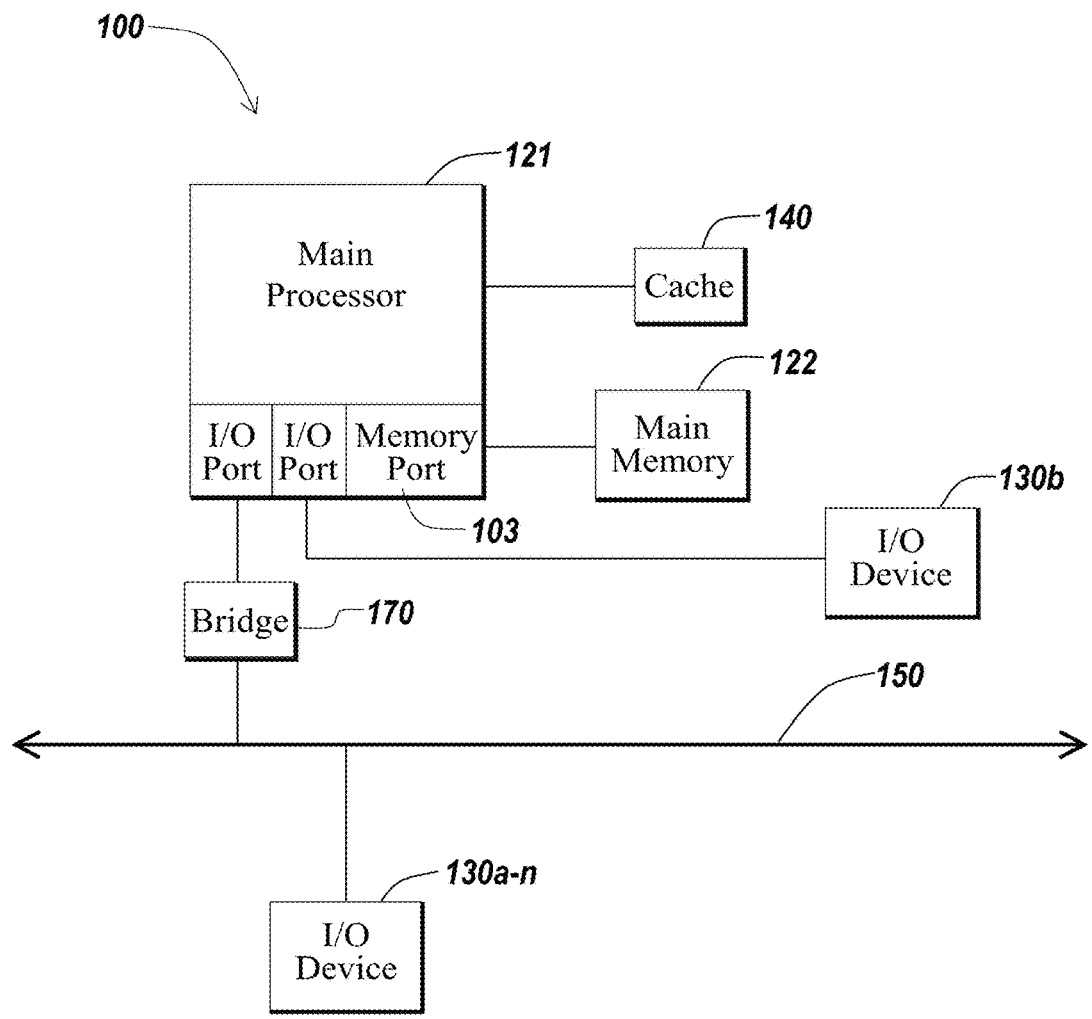
FIG. 1C is a block diagram depicting an example computing device.

The client 102 and server 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the client 102 or a server 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-102n, a keyboard 126 and a pointing device 127, such as a mouse. The storage device 128 may include, without limitation, an operating system and/or software. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many implementations, the central processing unit 121 is provided by a microprocessor unit, such as: those manufactured by Intel Corporation of Mountain View, Calif.; those manufactured by Motorola Corporation of Schaumburg, Ill.; those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), NAND Flash, NOR Flash and Solid State Drives (SSD). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other implementations, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For implementations in which the I/O device is a video display 124, the processor 121 may use an Advanced Graphics Port (AGP) to communicate with the display 124. FIG. 1C depicts an embodiment of a computer 100 in which the main processor 121 may communicate directly with I/O device 130b, for example via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, dials, touch pads, and drawing tablets. Output devices include video displays, speakers, inkjet printers, laser printers, projectors and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other implementations, the computing device 100 may provide USB connections (not shown) to receive handheld USB storage devices such as the USB Flash Drive line of devices manufactured by Twintech Industry, Inc. of Los Alamitos, Calif.

Referring again to FIG. 1B, the computing device 100 may support any suitable installation device 116, such as a disk drive, a CD-ROM drive, a CD-R/RW drive, a DVD-ROM drive, a flash memory drive, tape drives of various formats, USB device, hard-drive or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., configured and/or designed for) the systems and methods described herein. Optionally, any of the installation devices 116 could also be used as the storage device. Additionally, the operating system and the software can be run from a bootable medium, for example, a bootable CD.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some implementations, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other implementations, the computing device 100 may include multiple video adapters, with each video adapter connected to one or more of the display devices 124a-124n. In some implementations, any portion of the operating system of the computing device 100 may be configured for using multiple displays 124a-124n. In other implementations, one or more of the display devices 124a-124n may be provided by one or more other computing devices, such as computing devices 100a and 100b connected to the computing device 100, for example, via a network. These implementations may include any type of software designed and constructed to use another computer's display device as a second display device 124a for the computing device 100. One ordinarily skilled in the art will recognize and appreciate the various ways and implementations that a computing device 100 may be configured to have multiple display devices 124a-124n.

In further implementations, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, or a HDMI bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, manufactured by Google Inc; WINDOWS 7 and 8, manufactured by Microsoft Corporation of Redmond, Wash.; MAC OS, manufactured by Apple Computer of Cupertino, Calif.; WebOS, manufactured by Research In Motion (RIM); OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 100 has sufficient processor power and memory capacity to perform the operations described herein. For example, the computer system 100 may comprise a device of the IPAD or IPOD family of devices manufactured by Apple Computer of Cupertino, Calif., a device of the PLAYSTATION family of devices manufactured by the Sony Corporation of Tokyo, Japan, a device of the NINTENDO/Wii family of devices manufactured by Nintendo Co., Ltd., of Kyoto, Japan, or an XBOX device manufactured by the Microsoft Corporation of Redmond, Wash.

In some implementations, the computing device 100 may have different processors, operating systems, and input devices consistent with the device. For example, in one embodiment, the computing device 100 is a smart phone, mobile device, tablet or personal digital assistant. In still other implementations, the computing device 100 is an Android-based mobile device, an iPhone smart phone manufactured by Apple Computer of Cupertino, Calif., or a Blackberry handheld or smart phone, such as the devices manufactured by Research In Motion Limited. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some implementations, the computing device 100 is a digital audio player. In one of these implementations, the computing device 100 is a tablet such as the Apple IPAD, or a digital audio player such as the Apple IPOD lines of devices, manufactured by Apple Computer of Cupertino, Calif. In another of these implementations, the digital audio player may function as both a portable media player and as a mass storage device. In other implementations, the computing device 100 is a digital audio player such as an MP3 players. In yet other implementations, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some implementations, the computing device 100 includes a combination of devices, such as a mobile phone combined with a digital audio player or portable media player. In one of these implementations, the computing device 100 is a smartphone, for example, an iPhone manufactured by Apple Computer, or a Blackberry device, manufactured by Research In Motion Limited. In yet another embodiment, the computing device 100 is a laptop or desktop computer equipped with a web browser and a microphone and speaker system, such as a telephony headset. In these implementations, the computing devices 100 are web-enabled and can receive and initiate phone calls.

In some implementations, the status of one or more machines 102, 106 in the network 104 is monitored, generally as part of network management. In one of these implementations, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these implementations, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

Figure 2:
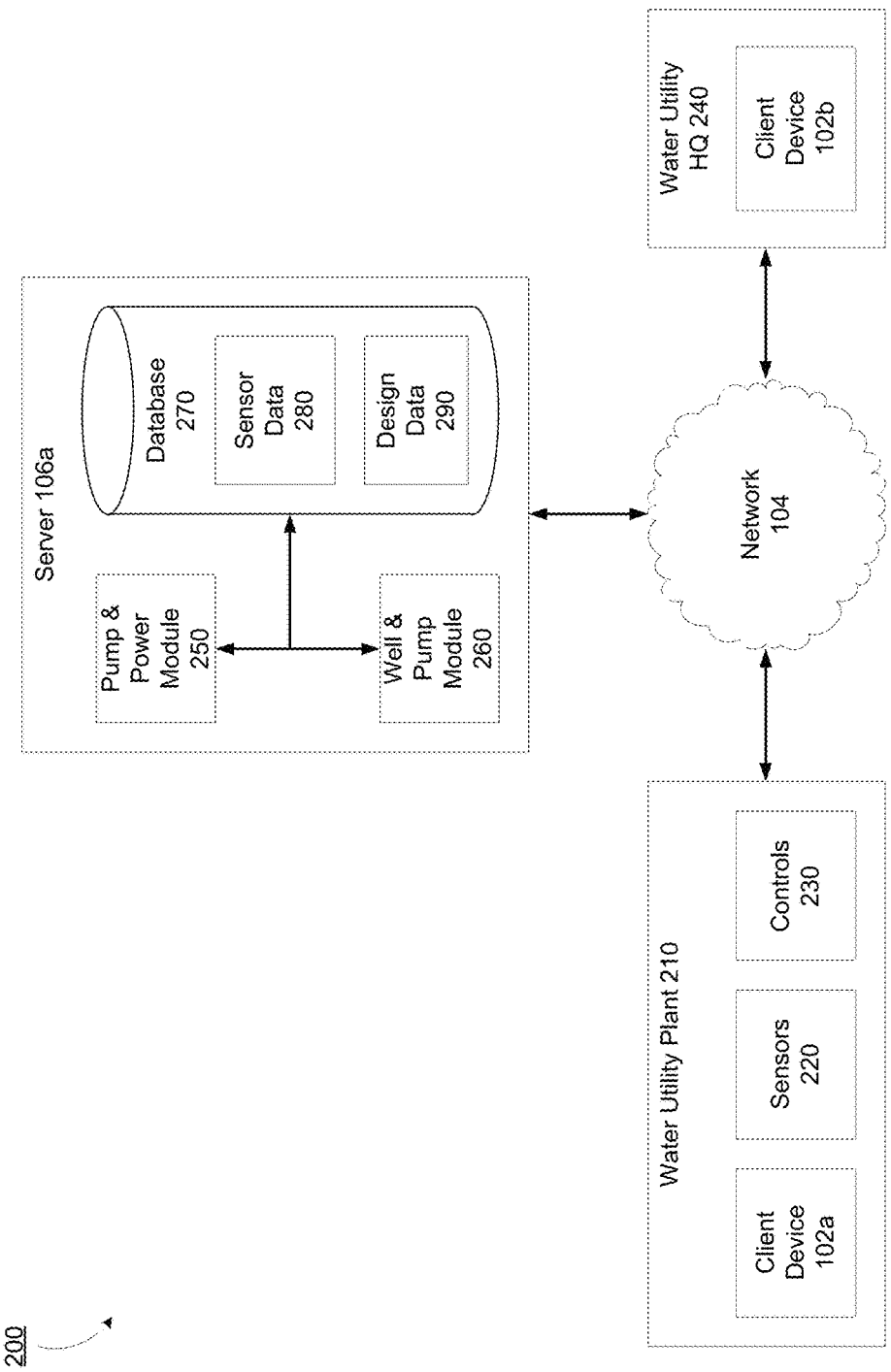
FIG. 2 illustrates a block diagram depicting an example environment for optimizing water utility operation, according to an illustrative implementation.

FIG. 2 illustrates a block diagram depicting an example environment for optimizing water utility operation. The environment 200 can include one or more servers 106a, one or more water utility plants 210, and one or more water utility headquarters 240. The water utility plant 210, water utility headquarters 240, and server 106a can communicate with each other via the network 104. The server 106a can host a pump and power monitor/module 250 and a well and pump monitor/module 260. The server 106a can execute a database 270. The database 270 can contain real-time sensor data 280 and design data 290. The sensor data 280 and design data 290 can pertain to various pumps, valves, tanks, pipes, etc. of the water utility plant 210. The database 270 can also contain executable instructions and scripts for performing the methods described herein.

The water utility plant 210 can consist of any type or combination of water utility such as waste water treatment, potable water treatment, well pump, desalination, or the like. The water utility plant 210 can contain a client device 102a, sensors 220, and controls 230. The client device 102a can store and execute instructions for monitoring the sensors 220 and implementing the controls 230. The client device 102a can receive data from the sensors 220, and transmit those data via the network 104 to the server 106a and the water utility headquarters 240. The client device 102a can receive commands via the network 104 from the server 106a and the water utility headquarters 240, and implement them commands via the controls 230. The client device 102a can additionally display the data from the sensors 220 locally, and implement locally entered commands via the controls 230.

The sensors 220 can include sensors for monitoring various parameters and conditions of the water utility plant 210. The sensors 220 can include sensors for measuring or monitoring Voltage "V," Current "I," power factor "PF," Power "KW", Motor speed "N," Discharge flow "F," Discharge Pressure "P" and water levels on suction side and discharge side (e.g.: overhead storage tanks). The sensors 220 can also include sensors for measuring temperature, torque, and vibration of the pump, or the temperature, viscosity, and density of the water.

The controls 230 can include any electrical or mechanical feature of the water utility plant 210 that can be controlled. The controls 230 can include various switches, actuators, solenoids, and motors for operating various types of valves, pumps, drains, gates, doors, covers, sprinklers, etc.

The server 106a can execute the systems and methods for optimizing water utility operations. The server 106a can include the pump and power module 250, which can provide analytics related to surface water treatment plants and waste water pumping stations. Leveraging existing sensor infrastructure and streaming this data across the Internet, followed by data cleansing, several real-time intelligence and analytics would be made available. Pump and power monitor/module 250 can provide pumping energy consumption of the plant, pump operating efficiencies, wire-to-water efficiencies, KWH/1000 gallons or $/MG, maintenance alerts, and operations and management "O&M"/capital expenditure "CapEx" guidance. In cases where there is no discharge pressure sensor, pump and power module can predict discharge pressure based available design information. The pump and power module 250 can display the analytics via a dashboard interface such as the example dashboard 600 shown in FIG. 6.

The server 106a can include the well and pump monitor module 260, which can provide analytics related to ground water treatment plants or farms that uses ground water pumping systems. Among the analytics that the well and pump module 260 can provide are all of the insights that the pump and power module 250 can provide plus well performance, aquifer recharge rates, pump run times, well yield/production, maintenance alerts, and safe pumping levels. In scenarios where there is not well water level sensor the analytics will be able to predict water level based on all the other sensor information. The well and pump module 260 can display the analytics via a dashboard interface such as the example dashboard 900 shown in FIG. 9.

The server 106a can offer additional analytics as well, either through the modules 250 and 260 or other modules. These analytics can include water quality and age insights, water loss monitoring, distribution network health and warning, consumer usage efficiencies, and combined sewer overflow monitor.

The examples of the pump and power module 250 and the well and pump module 260 are not meant to be limiting. The server 106a can include additional modules for waste water treatment plants, desalinization plants, and others. The modules of the server 106a can exist in combination or execute separately.

The water utility headquarters 240 can be a central location where control or monitoring of the water utility plant 210 can be performed. The water utility headquarters 240 need not be remote from the water utility plant 210, and in fact can be co-located. The water utility headquarters 240 can include a client device 102b. In implementations where the water utility headquarters 240 and the water utility plant 210 are co-located, the client 102a and the client 102b can be the same computing device. The client device 102 can display the insights provided by the pump and power module 250 and the well and pump module 260 including the example dashboards 600 and 900.

Figure 3:
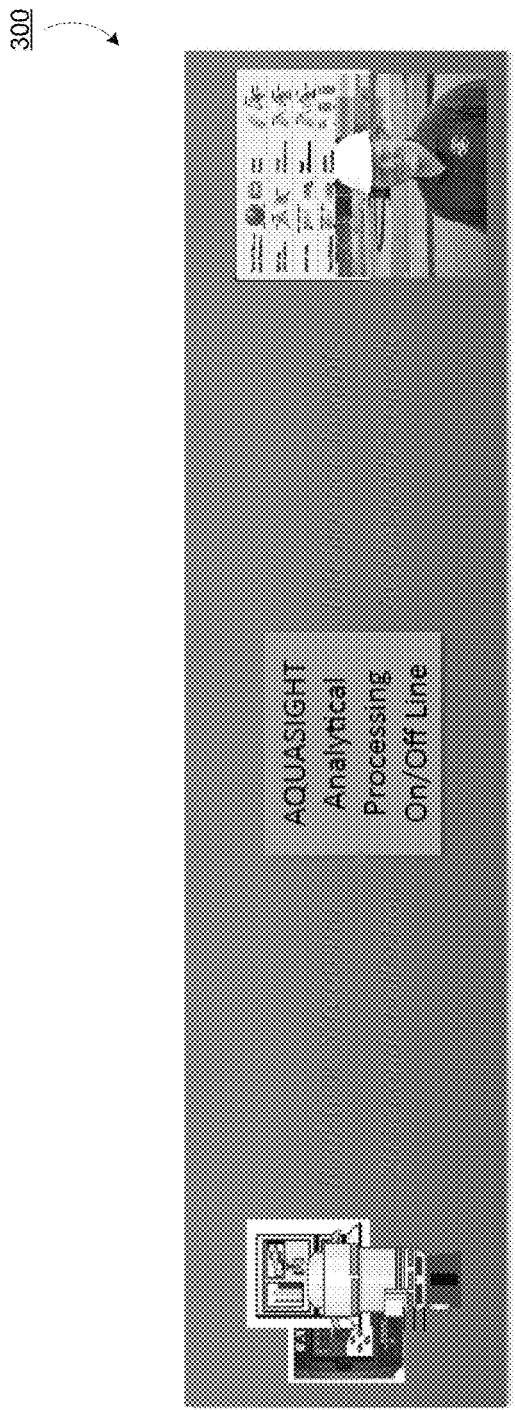
FIG. 3 illustrates a block diagram depicting an example operation for providing water utility analytics, according to an illustrative implementation.
Figure 4:
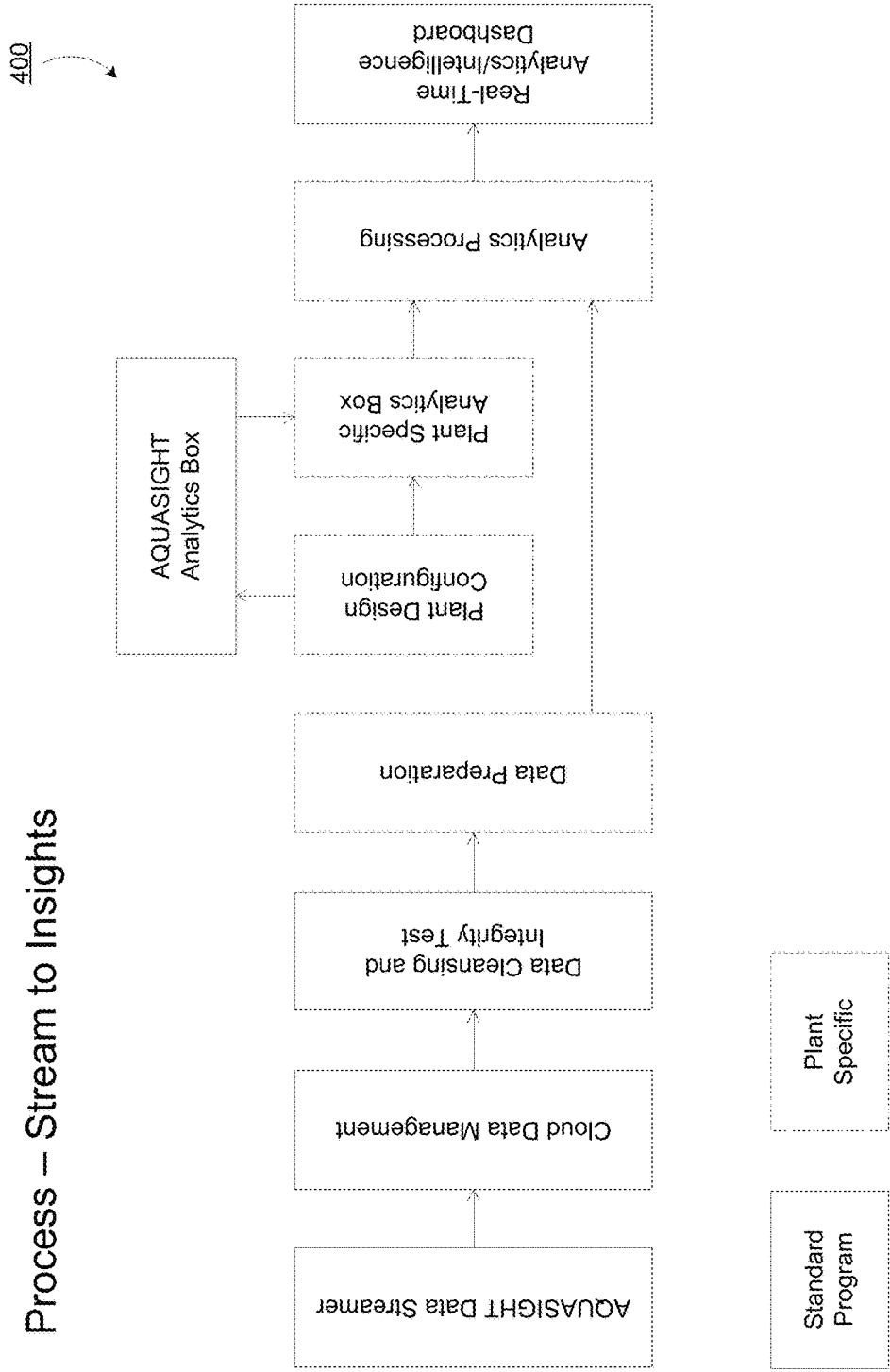
FIG. 4 illustrates a block diagram depicting an example process from data stream to analytics insights, according to an illustrative implementation.

FIG. 3 illustrates a block diagram depicting an example operation 300 for providing water utility analytics. The server 106a can host the AQUASIGHT Analytical Processing online or offline. Offline includes Analytics work bench where data scientists have access to sensor data and other batch analytics data for them to perform additional intelligence. In addition, analytics workbench can be a self service application for water utility operators to perform over and above what is not already available through real-time dashboard. The server 106a can receive real-time streaming of live sensor data and design data from the water utility plant 210. The live sensor data from the water utility plant 210 can include V, I, PF, N, F, P, and water level, either for individual pumps or for the entire system. The design data can include pump curves, motor efficiencies, variable frequency drive ("VFD") specifications, electric rate card, elevation losses, and friction losses. The server 106a can provide real-time streaming analytics to the water utility headquarters 240. The analytics can include operation insights, maintenance insights, and capital insights listed below. The server 106a, in providing these analytics, can accommodate multiple plan scenarios or configurations with configuration that would be different from plant to plant. The Real-time analytics include:

Avg. GPM for each pump and comparison between pumps
    Average GPM for the entire station
    Average flow per hour for the station
    Avg Station GPM vs Rated Capacity (% utilization)
    Pump operating states (hours, % of time)
    Pump operation status
    Pump turn on/off count (frequency of pump cycling)
    Average Pump Run Time
    $MG vs % Operating Time or Total Hours
    % Time spend at Each of Speeds
    Speeds vs $MG
    Average Pump Head by Pump
    Design pump curve vs real-time operation mashup
    Efficiency vs % of time and $MG
    Well level vs $MG
    Pump head vs $MG
    Speed vs flow, kw, pressure
    Weighted Average$ per MG for each Pump
    KW vs Pressure & Flow & Amps
    On-Peak Demand
    Energy consumed on/off peak %
    Total & Daily KWH/1000 gallons pumped
    Power factor frequency
    Total pump run time vs gallons pumped
    Pump operating frequency (flow, pressure, speeds)
    Motor load analysis
    Motor efficiency analysis
    Pump actual efficiency frequency
    Pump actual vs designed efficiency frequency
    Wire to Water efficiency frequency
    Discharge pressure prediction
    Well level prediction
    Well specific capacity analysis and well degradation metric
    Drawdown analysis
    Hourly sewer flow vs rain gauge readings
    System analysis when two or more pumps running simultaneously
    Station Run Time %
    Pump efficiency decay analysis
    Pump sweet sport operation analysis FIG. 4 illustrates a block diagram depicting an example process 400 from data stream to real-time intelligence. The process can receive the data stream from the sensors of the water utility plant 210 and provide results and plots real-time to the water utility headquarters 240. The process 400 can include generic processing that can apply one program standard to all water utility plants or sites. The process 400 can additionally include plant specific processing steps.

The generic processing can include the step of receiving the data stream at the server 106a, which can host the Aquasight Cloud. The server 106a can store the received data stream in the database 270. Processing steps can be performed by the server 106a, including the pump & power module 250 and/or the well & pump module 260. The server 106a can stream the time stamped sensor data in different format (e.g.: .csv files or JSON) through a Restful API or other interfaces to server 106a. Subsequently, this streaming data can be either stored in a time series farms or as a file that contains each time stamped sensor data. The server 106a can perform a data integrity test and subsequently cleanse the data. The clean data is now made available for further processing. In addition The server 106a can then output results of cleansing tests for understanding of quality of data that has been collected; for example, the data cleansing results 500 shown in FIG. 5.

The plant specific processing steps can include preparing the data for use for a particular water utility plant 210. The server 106a can receive raw data and process it according to a plant cleansing and preparation routine. In addition a plant specific input table can be a configuration file programmed to read in MatLab or by other application. The server 106a can then take the processed real-time plant data and the configuration file and create a plant specific analytic box or server. The server 106a can provide the plant specific analytic box using compiled MatLab or other analytics applications such R routines. The server 106a can provide results of the data processing including plots of the processed data.

A unique feature of the system is when pumps are not individually sensored and instead there are system level sensors. Even in aforementioned scenario real-time intelligence can be obtained using formulas and methods described below. The server 106a can, using the pump & power module 250, the well & pump module 260, or similar module, perform the processing described above using one or more of the following formulas for estimating pumping system performance 1. Take individual pump curve full speed operating point from manufacturer or utilize certified pump curves provided by the water utility
2. Use Affinity formula to define pump curve at various speeds for each individual pump. Set up multivariate regression analysis to predict pump, bhp, efficiency curves at various operating speeds (in cases where pump is driven by Variable Frequency Drives).

To estimate a pumping system designed efficiency for a system that has multiple pumps operating simultaneously the following method is deployed real-time (formulae 3 to 5)
3. Based on a) Discharge pressure converted to total dymanic pump head (real time)   ⎫
    b) # of pump turned on (VFD Read)   ⎬ Real-time Operating Point
    c) Speed at which each motor is running (VFD Read)   ⎭

4. Calculate designed pumping system efficiency at the real-time operating point as stated above $$Flow_{ps} \text{ Pumping System Flow} = \Sigma \begin{bmatrix} \text{Flows of individual pump} \\ \text{based on real-time operating} \\ \text{point of each pump} \end{bmatrix}$$

$$BHP_{ps} \text{ Pumping System BHP} = \Sigma \begin{bmatrix} \text{BHP of individual pump} \\ \text{based on real-time operating} \\ \text{point of each pump} \end{bmatrix}$$

$$\eta_{ps}\text{Pumping System } \eta = \frac{\eta_1 \times FLOW_1 + \eta_2 \times FLOW_2 + \eta_3 \times FLOW_3}{FLOW_{ps}}$$

5.

$$VFD \text{ Frequency Reading }(H_3) = \frac{\text{Rated speed of motor}}{60}$$

6.

$$\text{Real Time Motor Load} = \frac{Power_{IN}}{Power_{InRated}} \times 100$$

7.

$$Power_{InRated} = \frac{\text{Rated Horsepower} \times 0.7457}{\eta \text{ at Full load}}$$

8. Real–Time Motor Efficiency=@Speed & @Load Select Motor Efficiency from motorcurves

9.

Pump Head $TDF$ (ft) = [Pressure $(PSI) \times 2.31$] +

Elevation Loss (ft) + Friction Loss (ft) − Suction side pressure (ft)

10.

Real-Time Pump Efficiency=

$$\frac{[\text{Actual Flow Rate } (GPM) \times \text{Pump Head (ft)}]/3960}{\text{Calculated } BHP}$$

11. Calculate BHP=Real–Time Motor Efficiency×$Power_{In}$×1.341

FIG. 5 illustrates an example table of data cleansing results. The server 106a can execute software code such as a SQL script to perform certain data cleansing and preparation operations. These operations can include removing sensor spikes, detecting plant shutdowns, filling up missing data, eliminating negative numbers, check for time crawl, ensuring data correctness between flow and kilowatts, and calculating additional measure using sensor data prior to analytics. An example result of data cleansing and preparation is shown in table 500. The first column lists the sensorID for each relevant sensor (one sensor per row of the table). The second column lists in the number of shutdown events for the plant associated with the sensor. In this example, the data stream reflects no plant shutdowns. The third column lists the number of missing rows of data. In this case, each sensor is missing two rows of data. The fourth column lists the number of missing values of sensor data. In this case, the table 500 indicates that there are no missing values of sensor data. The fifth column lists the number of negative values of sensor data. In this case, there are no negative values of sensor data. The sixth column lists the number of reading spikes for each sensor. In this case, the table 500 indicates that the sensors FC2, VV4, VA4, KW1%, and VS4 have experienced spikes. The seventh column lists the kilowatt alignment for each sensor. The system collects time stamped data for various pump parameters including flow (f), pressure (p), kilowatt (kw) etc. When a pump turns off there is no power going into the pump and hence KW=0 instantaneously; however due to momentum of pump (mechanical system) and water (hydraulic), there will be some flow at that time stamp even though the pump is turned off. Often that flow is irrelevant in the big-data analysis. Accordingly, during cleansing test the system cleanses the data and sets the flow to zero when the pump is turned off to prevent error in the analysis (i.e., prevent division by zero). This is referred to as "kilowatt alignment"; i.e., aligning flow to reflect KW=0. In data cleansing results 500, the sensors FC1 and FC2 require a kilowatt alignment of 1165 and 1207, respectively. The table 500 is provided as an example only. In practice, tables may have more or fewer rows and/or columns.

Figure 6:
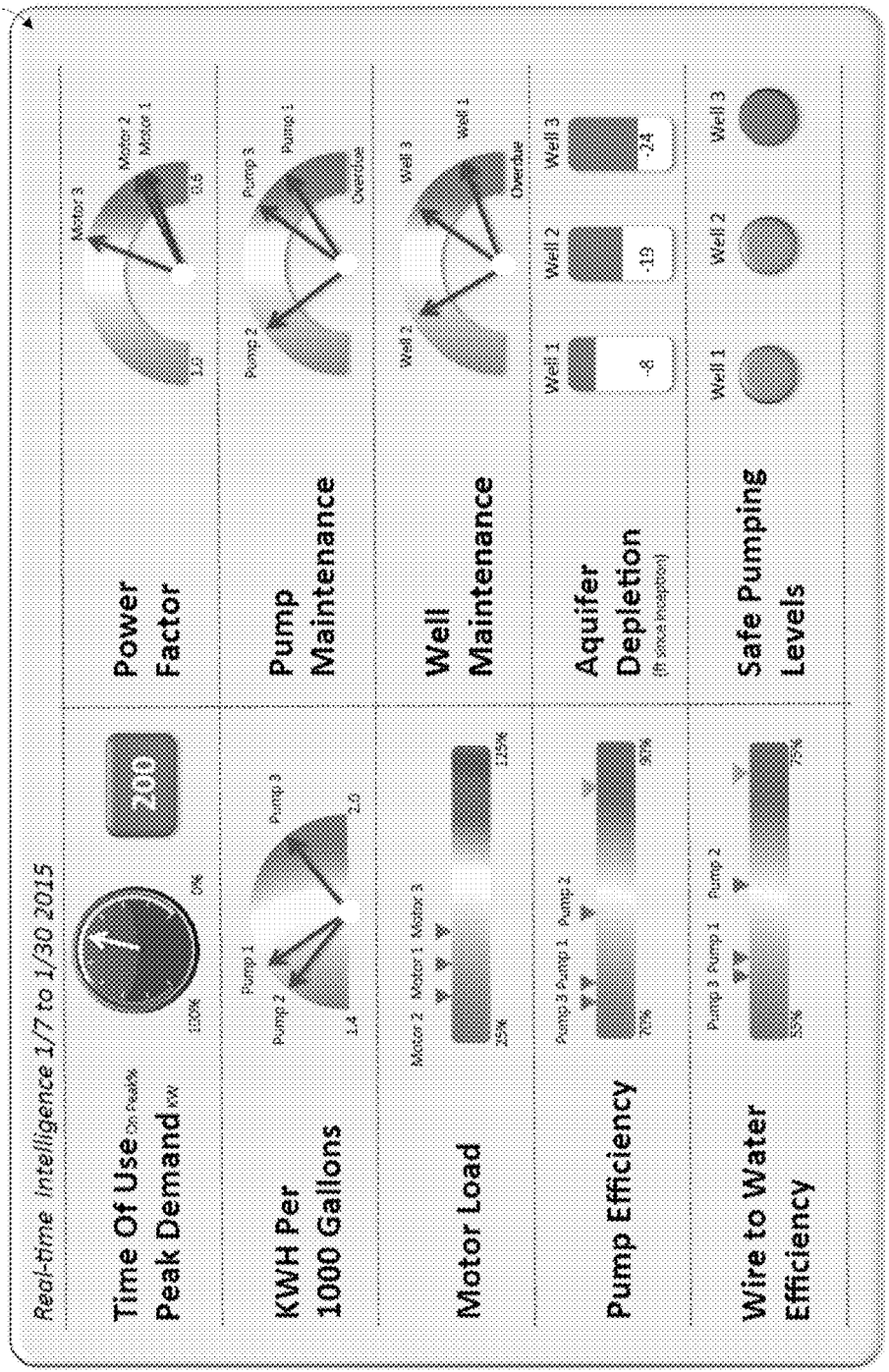
FIG. 6 illustrates an example ground water treatment plant dashboard, according to an illustrative implementation.

FIG. 6 illustrates an example ground water treatment plant dashboard 600, according to an illustrative implementation. The server 106a can transmit the results of the analytics to the water utility headquarters 240 for display as the dashboard 600 by the client device 102b. The dashboard 600 can include real-time intelligence for the water utility plant 240 for a given time period. There are many Key Performance Indicators, that can be displayed on the dashboard 600 e.g.: time of use (on-peak %) and peak demand (in KW); KWH per 1,000 Gallons; motor load; pump efficiency; wire-to-water efficiency; power factor; pump maintenance; well maintenance; aquifer depletion (in ft. since inception); and safe pumping levels.

The dashboard 600 can display the time of use as a measure of on-peak percentage. An analog or digital readout can indicate the percentage of time that the water utility plant 210 operated at peak demand. The dashboard 600 can display the peak demand in kilowatts over a specified viewing period.

The dashboard 600 can display the real-time amount of energy, in kilowatt hours, used by the water utility plant 210 to pump 1,000 gallons of water and it can perform analytics for a sliding scale of user specified time horizon. The dashboard 600 can display the KWH per 1,000 Gallons or $/MG for each pump of the water utility plant 210. In the example in FIG. 6, Pump 3 appears to require more energy than Pump 1 or Pump 2 to move the same amount of water. This insight can indicate to the water utility headquarters 240 that Pump 3 or associated equipment or infrastructure should be investigated for needed maintenance or other well or aquifer issues.

The dashboard 600 can display the real-time or user specific time horizon load on each motor of the water utility plant 210. The dashboard 600 can display the motor load as a percentage of the maximum motor load. A motor load that is too high or too low can indicate pumping system performance and demand put on the motor The dashboard 600 can display the real-time or user specified time horizon weighted actual average pump efficiency of each pump of the water utility plant 210. The dashboard 600 can display the pump efficiency as a percentage of a theoretical lossless system, or with reference to a designed peak efficiency. A pump efficiency that is too low can indicate operational adjustments or maintenance that might be required within the water utility plant 210 of one or more pumps.

The dashboard 600 can display the wire-to-water efficiency of each pump of the water utility plant 210. The dashboard 600 can display the wire-to-water efficiency as a percentage of a theoretical lossless system, or with reference to a practical peak efficiency. A wire-to-water efficiency that is too low can indicate the need for adjustments within the water utility plant 210 or maintenance of one or more pumps.

The dashboard 600 can display the power factor of each motor of the water utility plant 210. A power factor that is too low can indicate poor power efficiency and power delivered by the electric utility is much higher than what is actually being consumed. This could drive electric utilities to work with water utility to help improve their electrical infrastructure The dashboard 600 can display the need for maintenance of each pump of the water utility plant 210. A significant gap between actual efficiency vs designed efficiency at that condition flow, speed and head condition is often a good indicator of wear in the system.

The dashboard 600 can display the need for maintenance of each well of the water utility plant 210. Well specific capacity degradation is the metric used to explain the drop in well production and is a good indicator when a well is due for service if its specific capacity falls below a threshold.

The dashboard 600 can display the aquifer static level depletion of each well of the water utility plant 210. Static level is measured real-time relative to a certain baseline number (usually the time of well construction or well rehabilitation) to provide real-time intelligence if the well static level has dropped. It is a good indicator of well recharging.

The dashboard 600 can display an indicator if each well is within a safe pumping level. This is a measurement of water level with in a well once the pump is turned on and after a certain period of time, and is often a good indicator of whether the pump is operating with sufficient water levels in the well.

Figure 7:
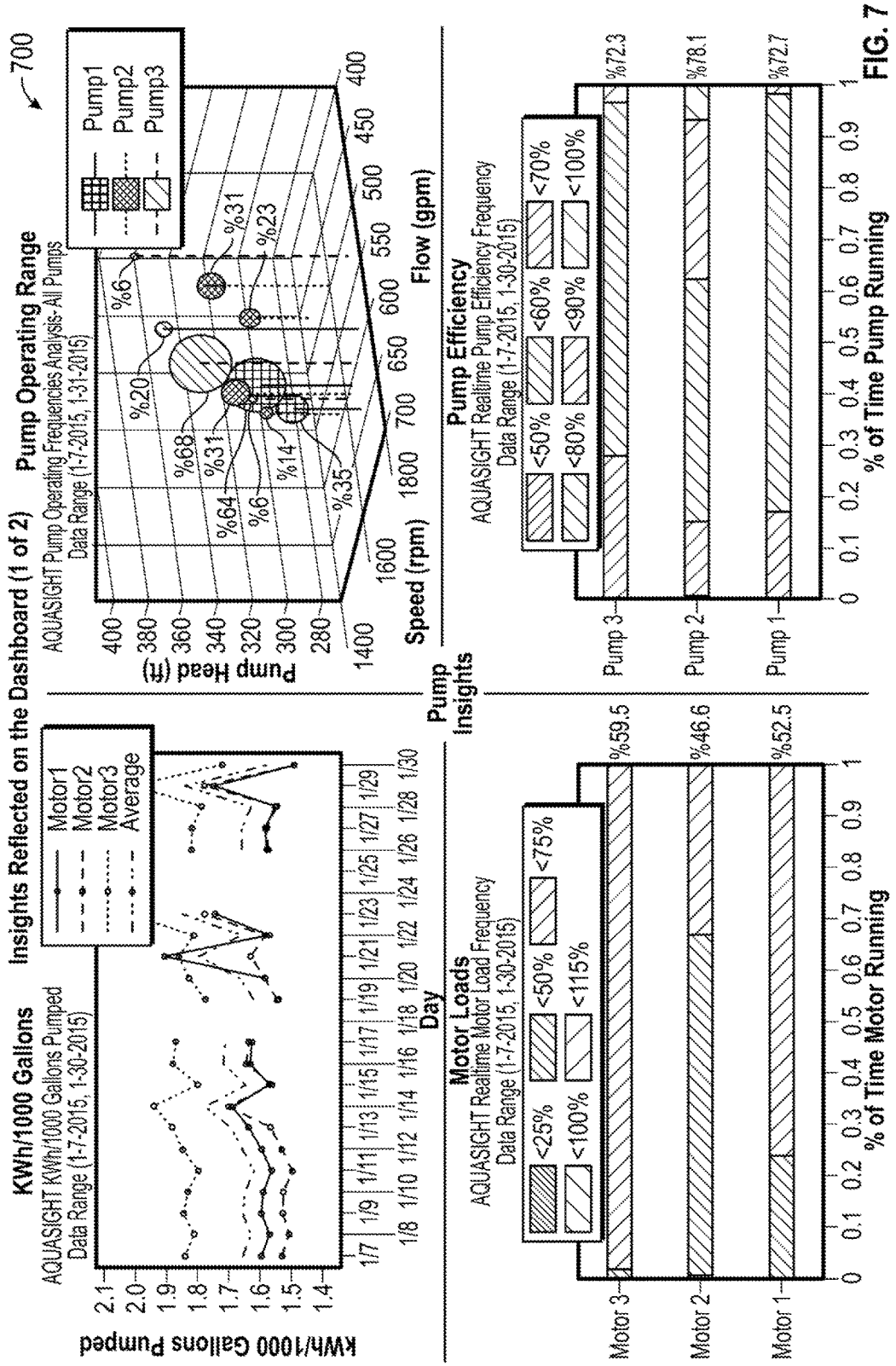
FIG. 7 illustrates example intelligence and insights reflected on the drill down dashboard, according to an illustrative implementation.

FIG. 7 illustrates example insights 700 reflected on the dashboard 600, according to an illustrative implementation. A user can reach each insight 700 by selecting the relevant area of the dashboard 600. Selecting the KWH per 1,000 gallons area of the dashboard 600 will open the corresponding insight. The KWH per 1,000 gallons insight displays a time-series plot of the KWH per 1,000 gallons for each motor and an average for all motors. Selecting the motor load area of the dashboard 600 will open the corresponding insight. The motor loads insight can display the real-time motor load frequency for a given date range. The motor load insight reveals that motor 3, for example, is running at an average load of 59.5%. The motor load insight can additionally reveal that motor 3 runs at less than 75% load most of the time, while running at less than 50% load for only a small portion of the time. Selecting the pump operating range will open the corresponding insight. The pumping operating range insight can be displayed as a three-dimensional scatter plot with color and size mapping. The colors can represent each pump of the water utility plant 210. The size of each bubble can represent the percentage of time a pump operates within a given range. The axes of the graph can correspond to pump speed (in RPM), flow (in GPM), and pump head (in ft.). Selecting the pump efficiency area of the dashboard 600 will open the corresponding insight. The pump efficiency insight can display the real-time pump efficiency for a given date range. The pump efficiency insight reveals that pump 3, for example, runs at an average efficiency of 72.3%. The pump efficiency insight can additionally reveal the portions of time during which pump 3 runs within various efficiency ranges; for example, less than 100%, less than 90%, less than 80%, etc.

Figure 8:
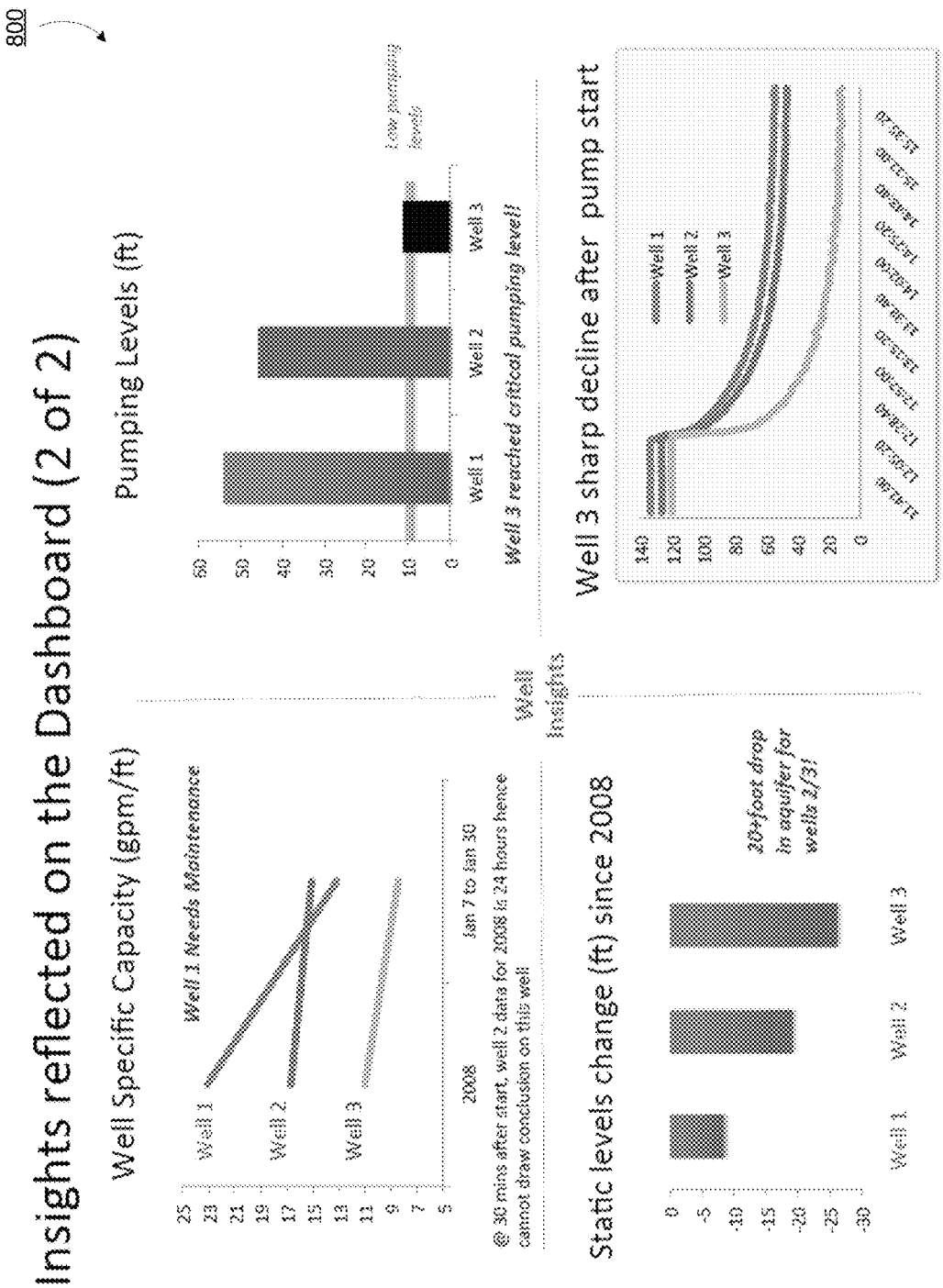
FIG. 8 illustrates additional example insights reflected on the dashboard, according to an illustrative implementation, according to an illustrative implementation.

FIG. 8 illustrates additional example insights 800 reflected on the dashboard 600, according to an illustrative implementation. A user can reach each insight 800 by selecting the relevant area of the dashboard 600. Selecting the well maintenance area of the dashboard 600 can open the corresponding insight including the well specific capacity insight. The well specific capacity insight can display the specific capacity of each well in terms of gallons per minute per foot. The well specific capacity insight can plot the change in the well specific gravity over time. For example the sharp decline in well specific capacity for well 1 indicates the need for maintenance. Selecting the aquifer depletion area of the dashboard 600 can open the corresponding insight including the static levels change insight. The static levels change insight can display the change in water level of each well over a given period of time. For example, wells 2 and 3 have experienced a 20+ foot drop since 2008. Selecting the safe pumping levels area of the dashboard 600 can open the corresponding insights including the pumping levels and a time-series plot of pumping levels. The pumping levels insight can display the pump level in feet for each pump. For example, the pumping levels insight can indicate that well 3 has reached a low pumping level. The time-series plot of pumping levels can indicate that well 3, for example, experiences a sharp decline in pumping level immediately after pump start. The sharp decline in pumping level can indicate a need for well maintenance.

Figure 9:
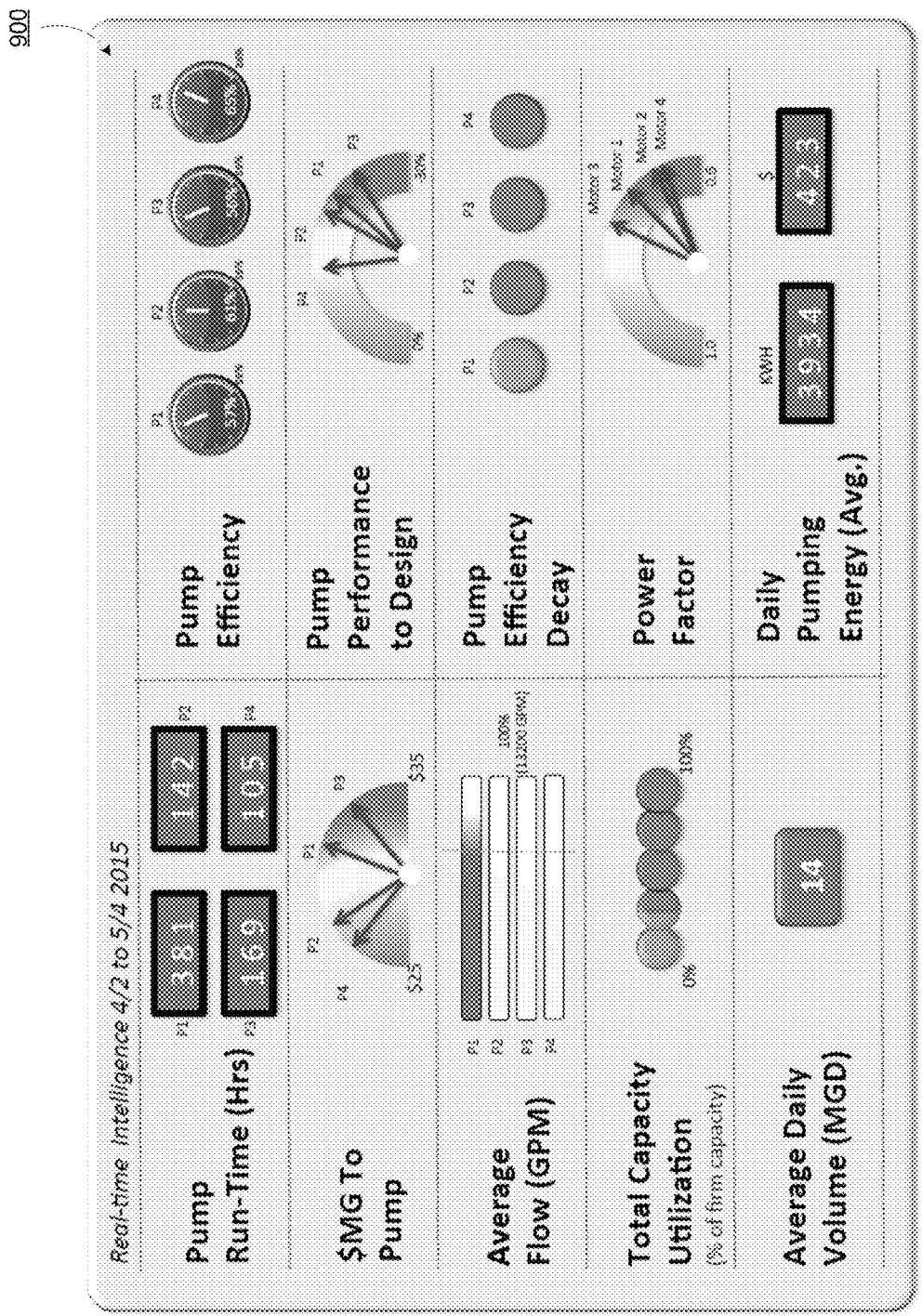
FIG. 9 illustrates an example waste water pumping station dashboard, according to an illustrative implementation.

FIG. 9 illustrates an example waste water pumping station dashboard 900, according to an illustrative implementation. The server 106a can transmit the results of the analytics to the water utility headquarters 240 for display as the dashboard 900 by the client device 102b. The dashboard 900 can include real-time intelligence for the water utility plant 210 for a given time period. The dashboard 900 can display pump run time (in hours); $MG to pump; average flow (in gallons per minute); total capacity utilization (as a percentage of firm capacity); average daily volume (in millions of gallons per day); pump efficiency; pump performance to design; pump efficiency decay; power factor; and daily pumping energy (in KWH, including the total cost).

The dashboard 900 can display the pump run time. The dashboard 900 can display the total run time of each pump of the water utility plant 210 in total hours. In this example, the dashboard reveals that pump 1 has had a much longer service life than pumps 2 through 4.

The dashboard 900 can display the cost to pump in dollars per million gallons ("$MG"). For example, the expected range for the water utility plant 210 to pump a million gallons of water may be between $25 and $35 per million gallons. In this example, the dashboard reveals that pump 4 is pumping relatively inexpensively while pump 3 is pumping relatively expensively.

The dashboard 900 can display the average flow, in gallons per minute, for each pump of the water utility plant 210. In this example, the dashboard reveals that pump 1, relative to its rated capacity, is well utilized. Pumps 2 to 4, are pumping well below their rated capacity, an indication that the pumps are oversized.

The dashboard 900 can display total capacity utilization in terms of percent of firm capacity. The firm capacity can represent the capacity of a single water utility plant 210 or a group of water utility plants 210.

The dashboard 900 can display the average daily volume, in millions of gallons per day, of the water utility plant 210 or a group of water utility plants 210.

The dashboard 900 can display the pump efficiency of each pump. In this example, the dashboard reveals that pump 1 is operating at 57% efficiency, pump 2 at 61%, etc.

The dashboard 900 can display pump performance to design. The pump performance to design metric indicates degree to which a pump is operating off its designed efficiency. It is an indication of pump wear. In this example, the dashboard reveals that pump 4 is deviating from its designed efficiency less than Pump 3.

The dashboard 900 can display the pump efficiency decay of each pump. The efficiency decay is an indicator of pump ragging or drawing excess energy for similar demand conditions. In this example, Pump 2-4 are experiencing efficiency which is warning and alert to an operator that maintenance of these pumps may be required.

The dashboard 900 can display the power factor of each motor of the water utility plant 210. A power factor that is too low is an indication of low power efficiency of these mechanical systems and draws alerts and attention to the operators.

The dashboard 900 can display the daily pumping energy of the water utility plant 210. The daily pumping energy can be displayed as an average for the day in kilowatt hours or across user specified date range. The daily pumping energy can also be displayed as a cost of energy for the day. In this example, the water utility plant 210 used 3,934 KWH at a total cost of $423.

Figure 10:
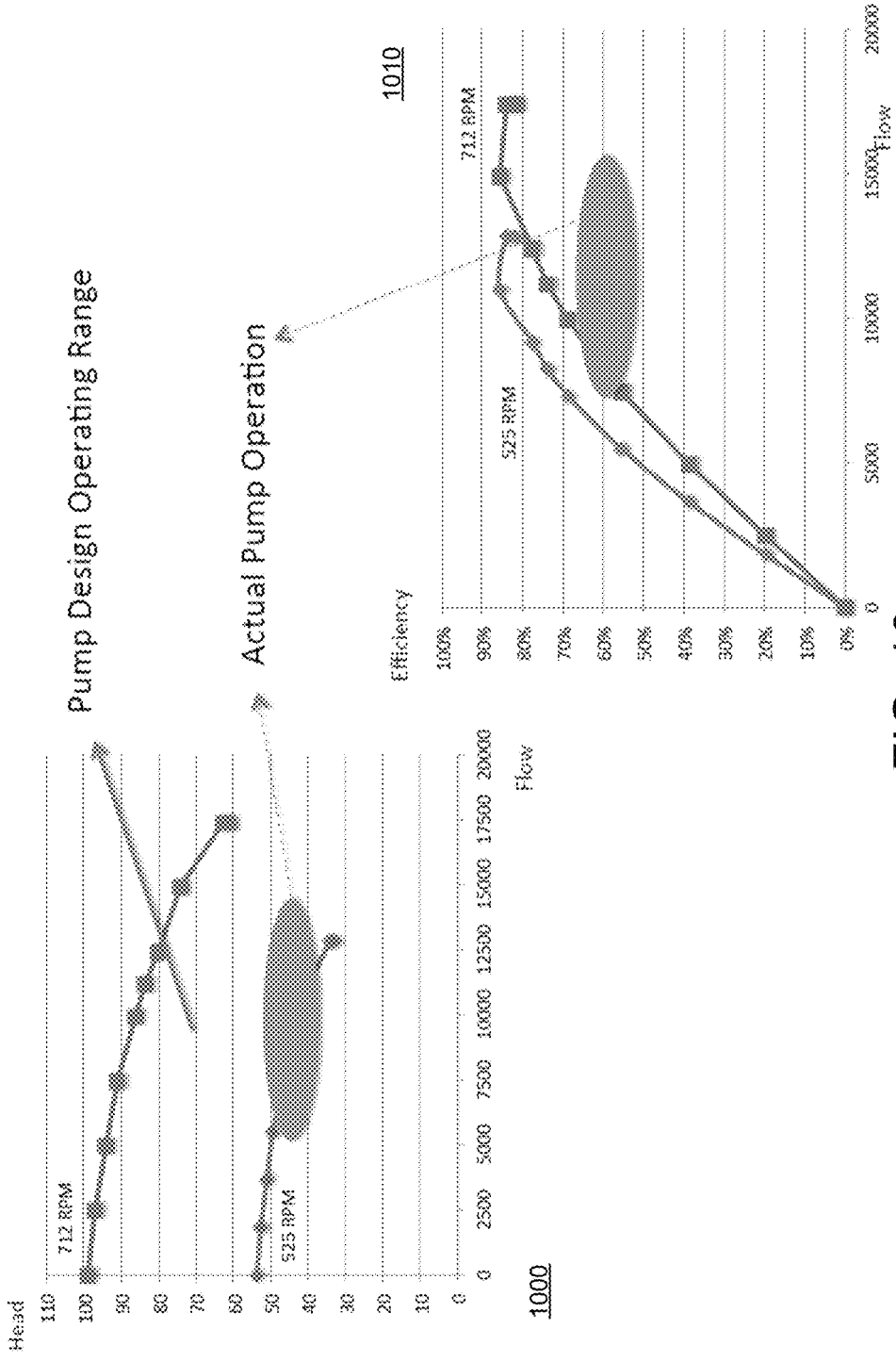
FIG. 10 illustrates example pump performance and efficiency curves.

FIG. 10 is a mash up of designed pump performance curves at min and max speed relative to actual pump operating range across the same speed range. FIG. 10 illustrates example pump performance curves 1000 and pump efficiency curves 1010. The examples in FIG. 10 illustrate how a pump can be "overdesigned" for a particular application. Then, using the insights provided by the system, pump operation can be adjusted to maximize efficiency. The pump performance curve with square symbols corresponds to a particular pump operated at 712 RPM and diamond represents the 525 RPM. This is a full designed operating range. The actual pump operation occurs in the oval across the entire speed range, at the lower end of this designed band—an indication of overdesigned system.

Figure 11:
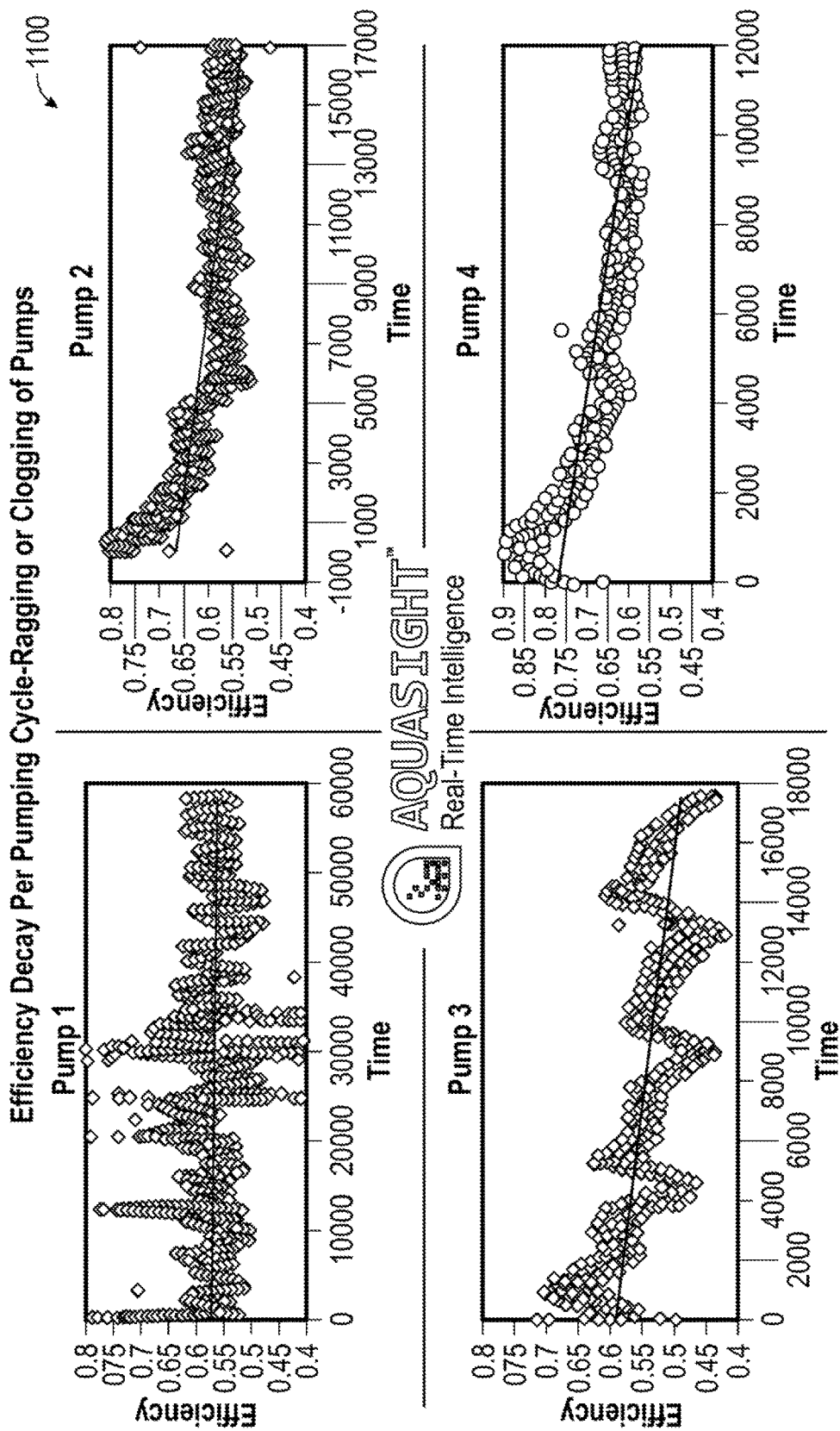
FIG. 11 illustrates example time-series plots of pump efficiency, according to an illustrative implementation.

FIG. 11 illustrates example time-series plots of pump efficiency, according to some embodiments. The efficiency plots 1100 illustrate examples of pumps suffering from ragging or clogging. The decay in efficiency illustrated in the efficiency plots 1100 can indicate a need for pumps drawing more energy over the pump run cycle. For example, the efficiency plot for Pump 1 illustrates changes in efficiency is driven by various operating conditions such flow, speed and discharge head. However, the efficiency plots for Pump 2 and Pump 4 reveal a gradual decay that is not correlated to decay in demand conditions indicative of ragging and clogging of pumps—a common phenomenon for waste water pumps.

Figure 12:
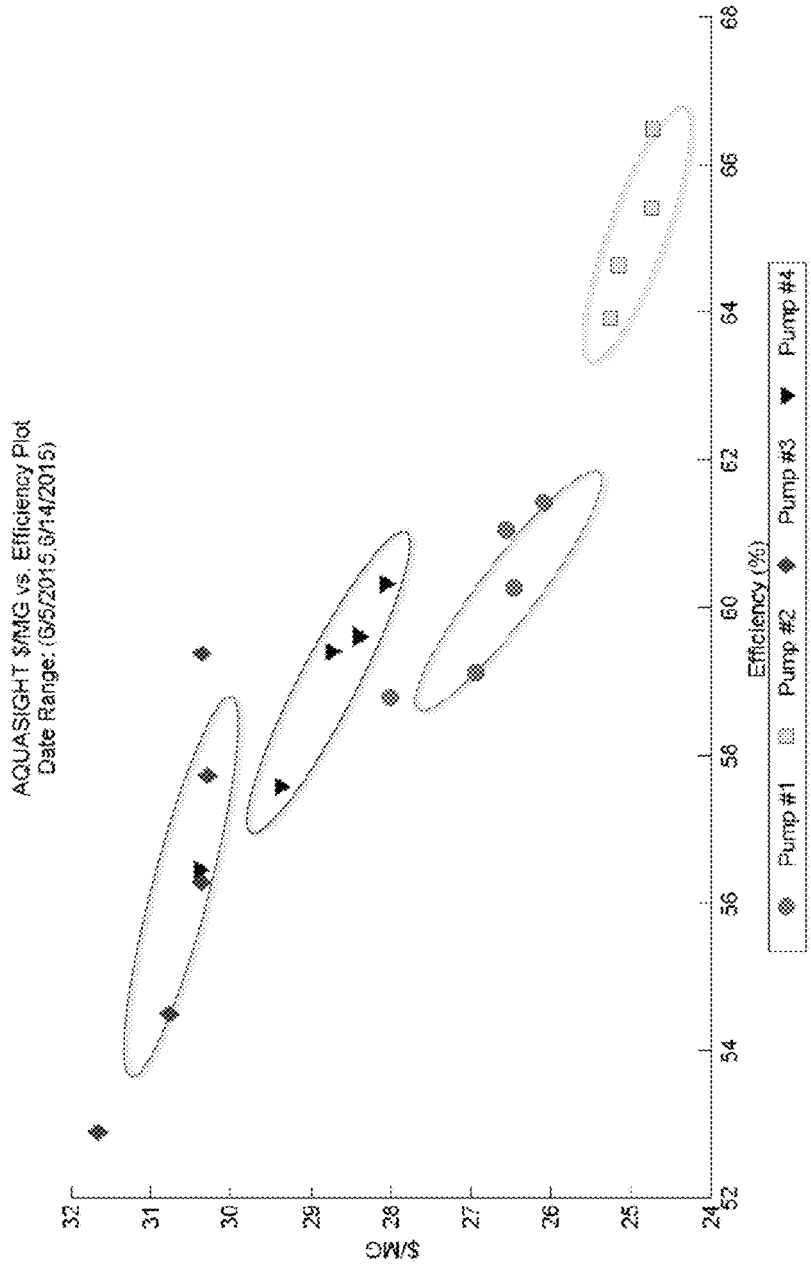
FIG. 12 shows a graph illustrating example relationships between efficiency and cost of operation of pumps, according to an illustrative implementation.

FIG. 12 shows a graph 1200 illustrating example relationships between efficiency and energy cost of operation of pumps. The graph 1200 includes four pumps: pump 1 (circle symbols), pump 2 (square symbols), pump 3 (diamond symbols), and pump 4 (triangle symbols). The data points for each of the pumps reveals a roughly inverse linear relationship between pump efficiency and cost to pump ($/MG or dollars per million gallons). The graph 1200 reveals that for each pump, a higher efficiency generally leads to a lower cost to pump a given volume of water.

Figure 13:
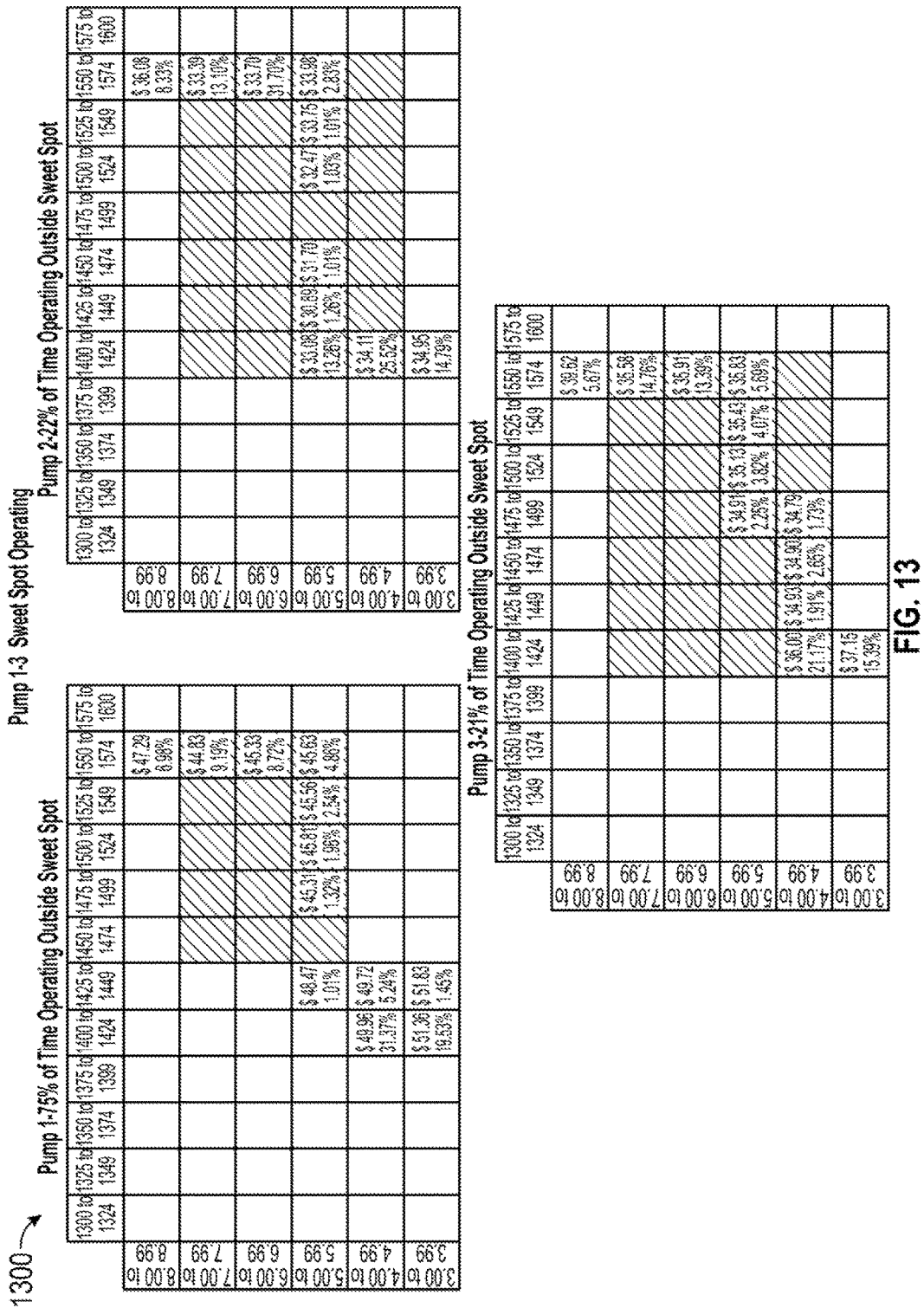
FIG. 13 illustrates example tables of sweet spot operation of three pumps, according to an illustrative implementation.

FIG. 13 illustrates example tables 1300 of sweet spot operation of three pumps. The tables 1300 break down the percentage of time each pump operates at various operating condition and its most cost effective zones. The x-axis indicated RPM of the pump and y-axis indicates wet well level. In each of the cell the numbers indicate $MG to pump and % of time spend at that operating condition.

Figure 14:
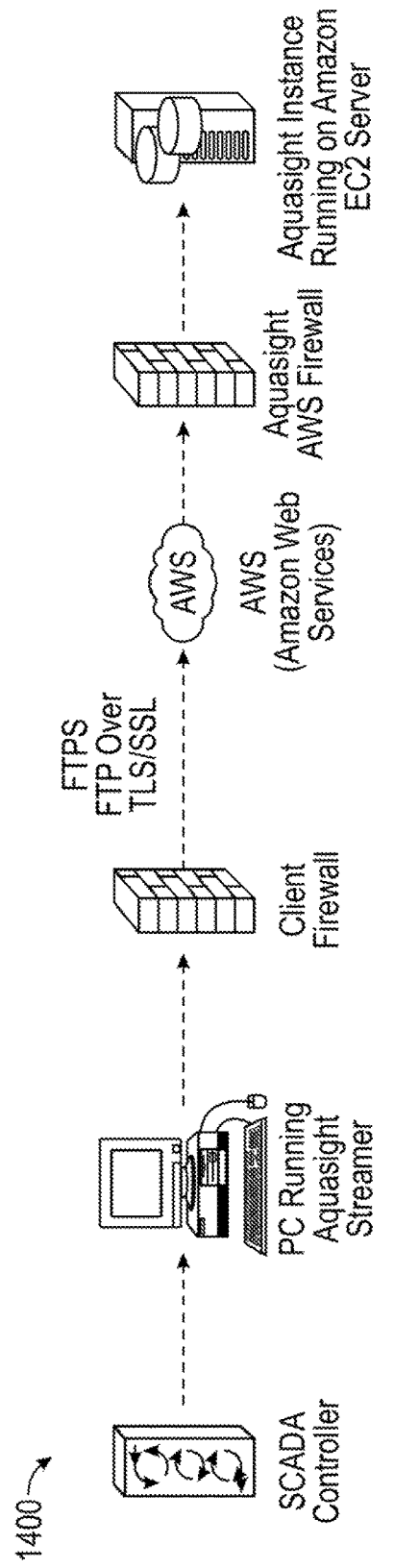
FIG. 14 illustrates a block diagram depicting an example environment for application security, according to an illustrative implementation.

FIG. 14 illustrates a block diagram depicting an example environment 1400 for application security. The environment 1400 can include a supervisory control and data acquisition ("SCADA") controller at the water utility plant 210; a PC—for example, the client device 102a—running the AQUASIGHT Data Streamer application; a client firewall; a cloud service provider such as Amazon Web Services ("AWS"); an AQUASIGHT AWS firewall; and an AQUASIGHT instance running on an Amazon EC2 server.

The AQUASIGHT Data Streamer application can retrieve data by connecting to SCADA controller servers via drivers built into the Data Streamer application. The Data Streamer passively collects from SCADA systems. The Data Streamer communicates independently with the open platform communications ("OPC") server. The data can be retrieved at a user defined interval and stored on the local client PC into a CSV file or send in a JSON or other data format through an API. The AQUASIGHT Data Streamer can remain running on the client PC and can be password protected against accidental termination. At an interval separate to the collection interval, the local CSV file can be sent to the AQUASIGHT server via FTPS. FTPS is a file transfer protocol that enables SSL encryption of communication. The private key can be stored on the AQUASIGHT server and public key transmitted to FTP clients during an FTP session for the encryption of data. The AQUASIGHT firewall can permit only FTPS traffic and directs that traffic to the FTP service, which handles authentication. The FTP server can be configured with user isolation to control which logged-in FTP users have access to which physical storage. This isolation can segregate client data and prevent unauthorized access into folders not belonging to the client. Client-side firewalls can be configured to have inbound traffic restricted to TCP port 990 (control channel) and only coming from the AQUASIGHT server to prevent unauthorized use of that port. If outbound traffic is restricted, then TCP ports 990 (control channel) and 5000-6000 (data channel range) must be permitted out to the AQUASIGHT server.

A completely locked down client-side firewall can be configured as shown in the table 1401. The client-side firewall can be configured to deny all access, inside or outside, via any source or destination ports. The client-side firewall can be configured with a small number of exceptions to permit transmission of data to and from the AQUASIGHT server and the PC running the Data Streamer application via the appropriate ports.

Figure 15:
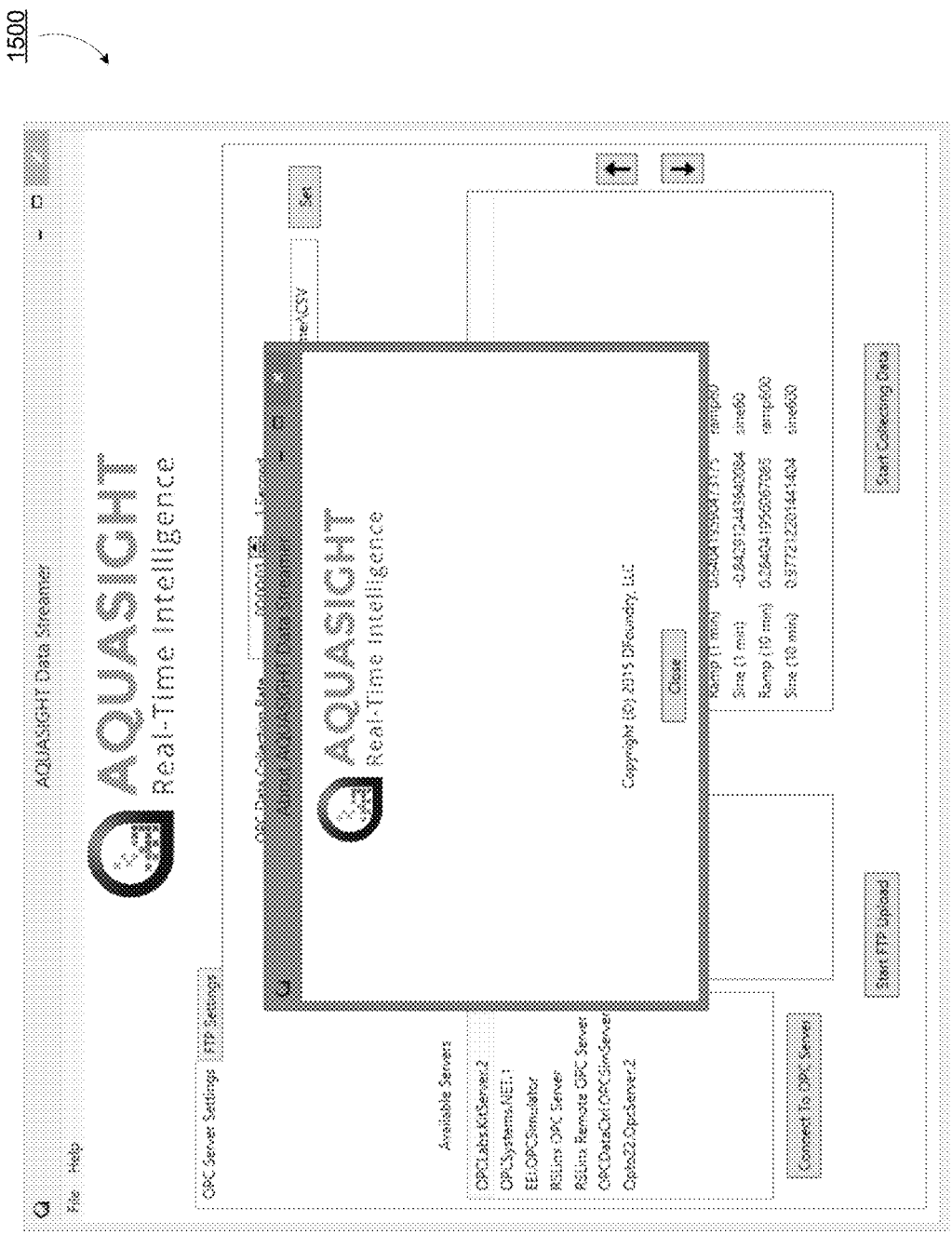
FIG. 15 illustrates an example screenshot of an implementation of the Data Streamer application, according to an illustrative implementation.
Figure 16:
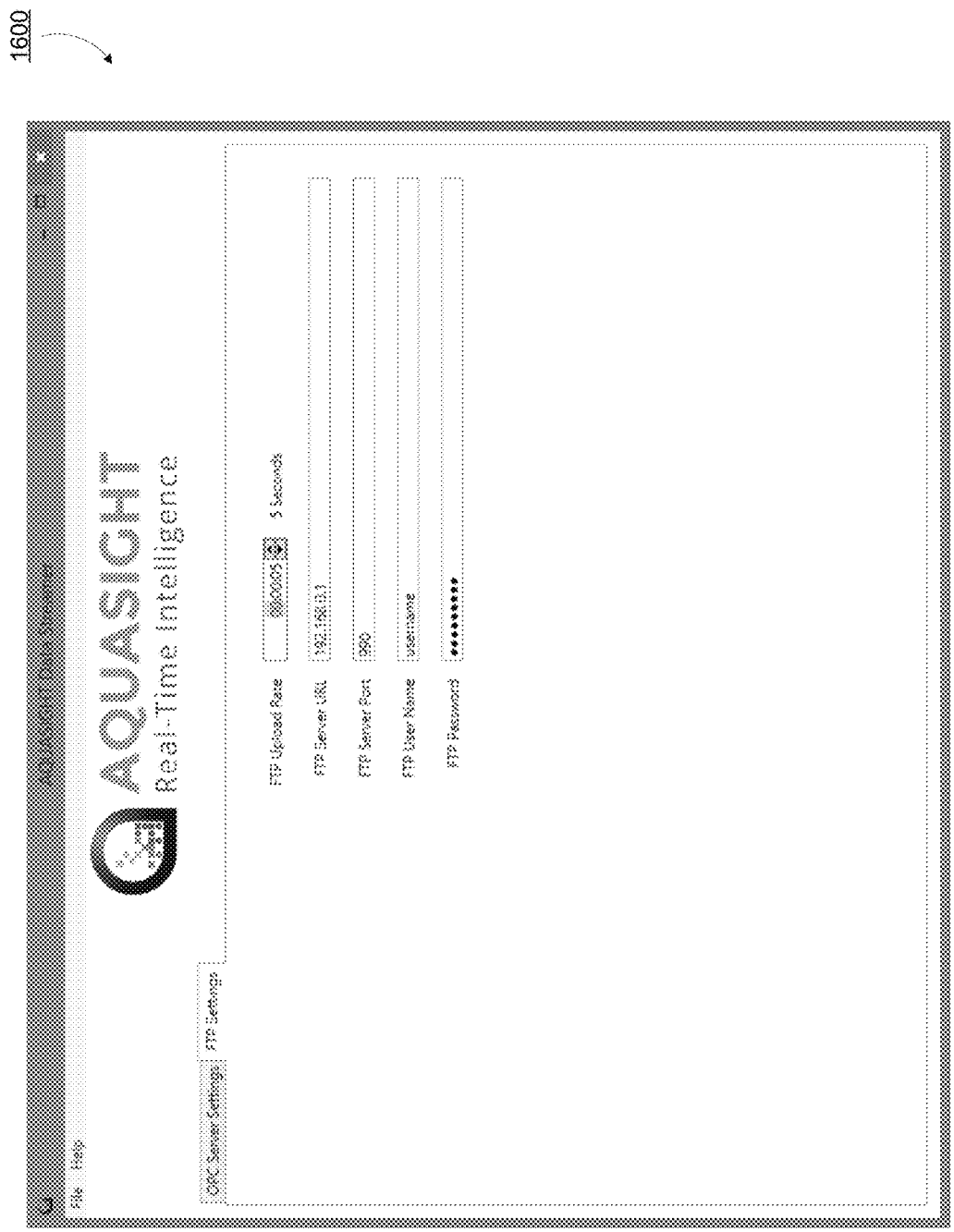
FIG. 16 illustrates an example screenshot of an implementation of the Data Streamer application, according to an illustrative implementation.
Figure 17:
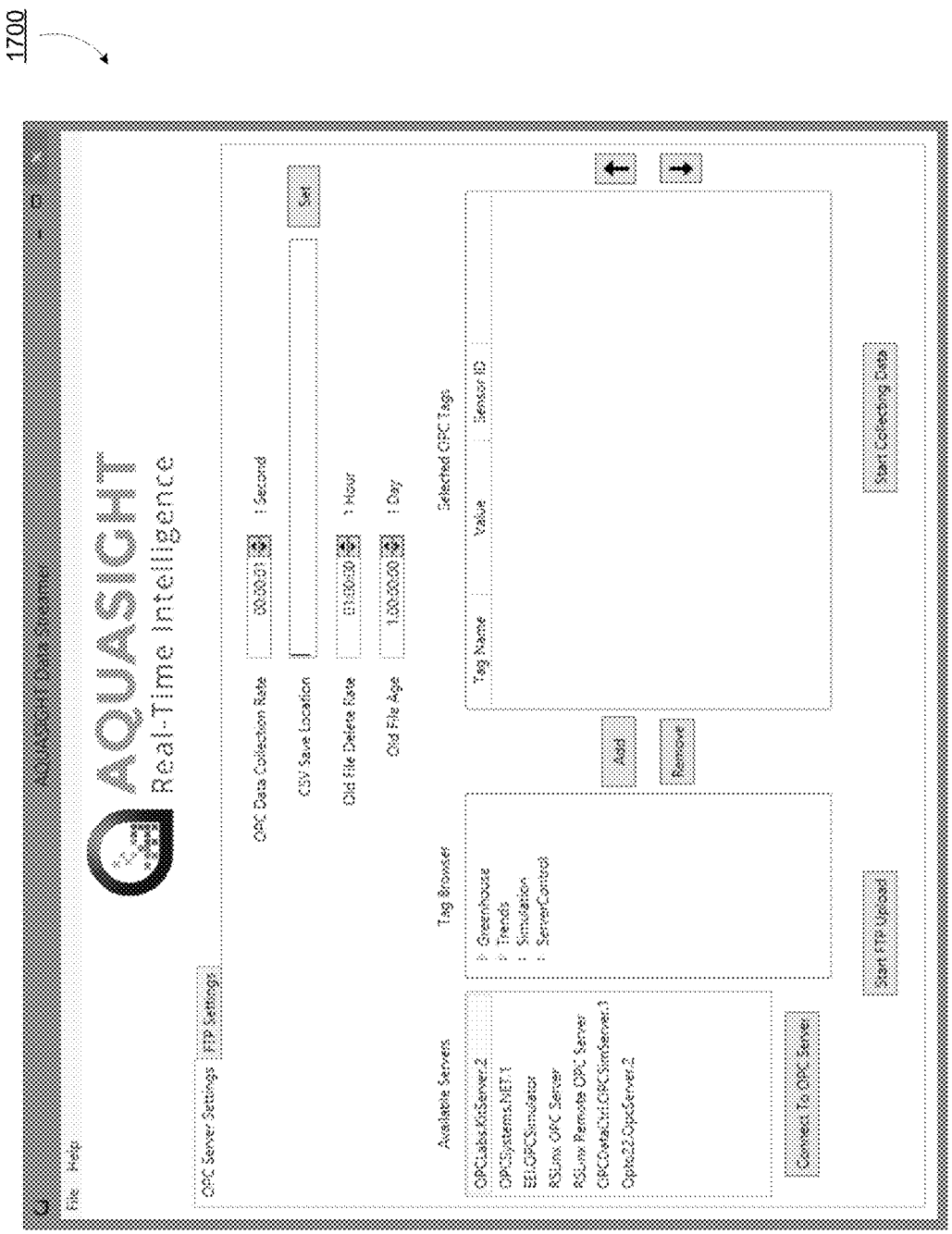
FIG. 17 illustrates an example screenshot of an implementation of the Data Streamer application, according to an illustrative implementation.
Figure 18:
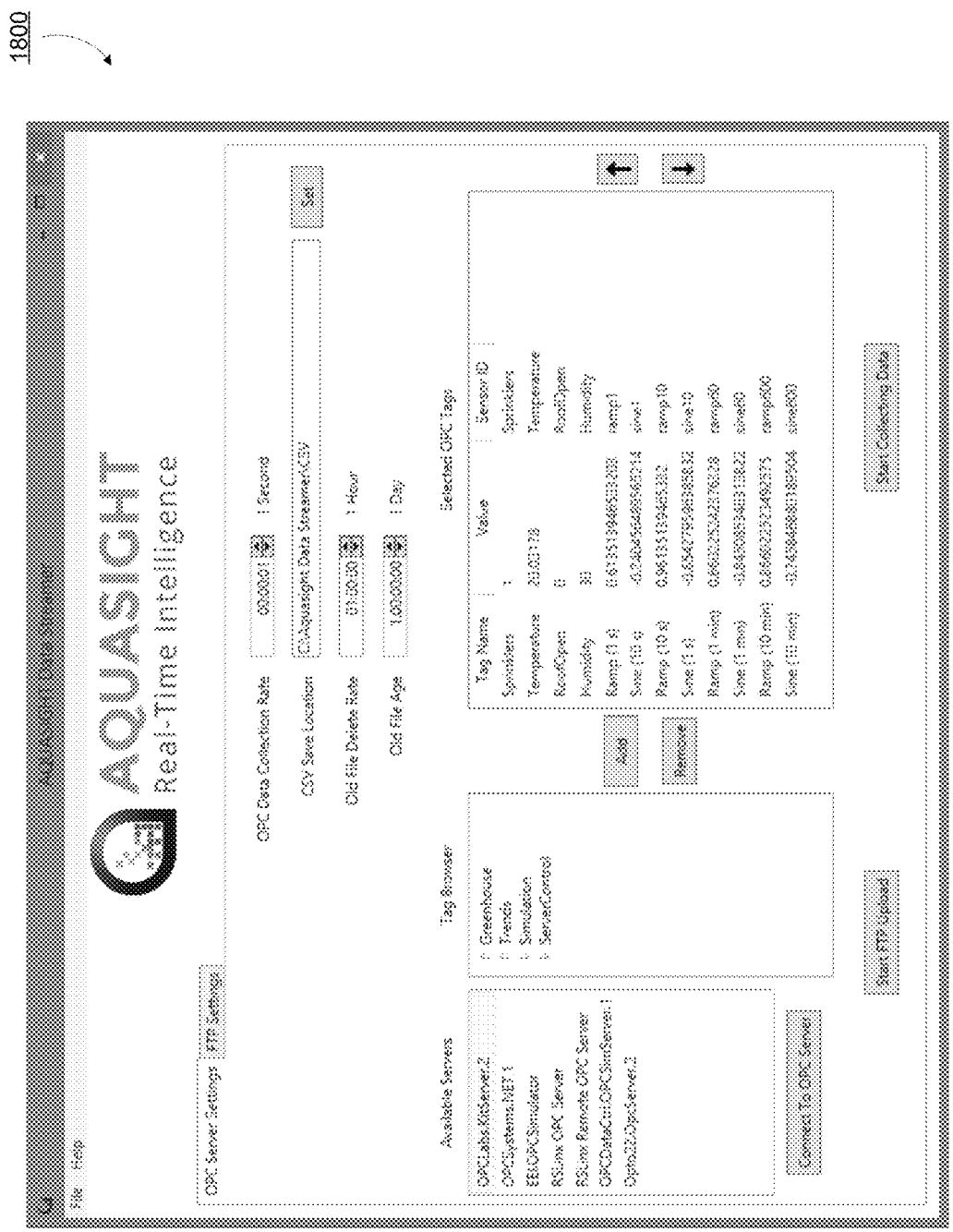
FIG. 18 illustrates an example screenshot of an implementation of the Data Streamer application, according to an illustrative implementation.

FIGS. 15-18 illustrate example screenshots 1500, 1600, 1700, and 1800 of an implementation of the Data Streamer application. The example screenshot 1500 of FIG. 15 shows an "about" window for the Data Streamer application. The "about" window can carry copyright, authorship, and version information of the particular instance of the Data Streamer application. The example screenshot 1600 of FIG. 16 shows the FTP configuration window of the Data Streamer application. The example screenshot 1700 of FIG. 17 shows the main screen of the Data Streamer application without data displayed. The example screenshot 1800 of FIG. 18 shows the main screen of the Data Streamer application with data displayed. In the example screenshot 1800, the CSV Save Location has been specified, and the data from the CSV file has been displayed in the Selected OPC Tags window.

Figure 19:
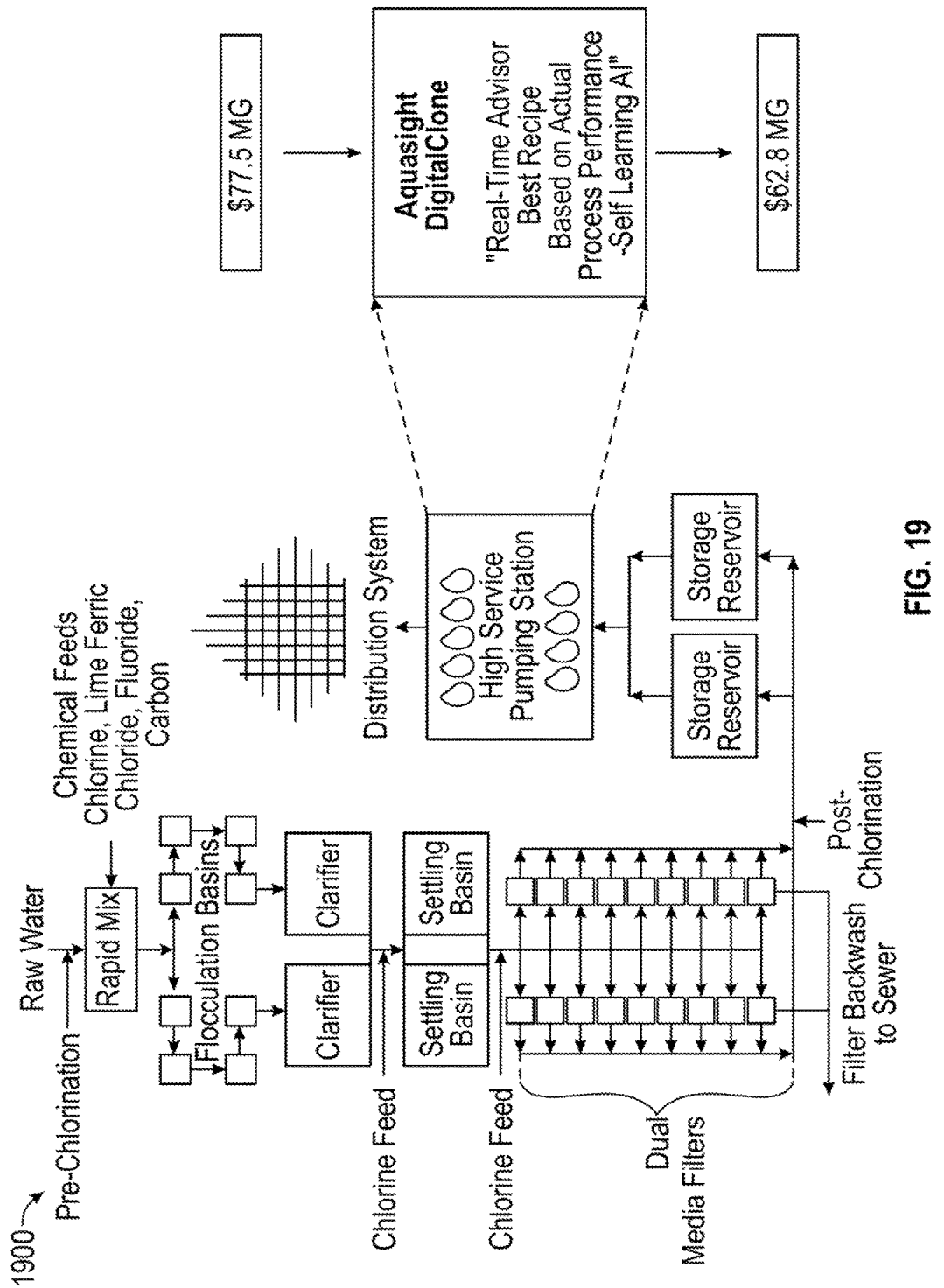
FIG. 19 illustrates an example of a system for providing a digital model of a pumping station, according to an illustrative implementation.

FIG. 19 illustrates an example of a system 1900 for providing a digital model of a pumping station, according to an illustrative implementation. The digital model also may be referred to as a "digital clone" of the pumping station. In some implementations, the digital model can be used to optimize or otherwise improve the performance of the pumping station.

To create the digital model, sensor data from the pumping station can be retrieved and processed to generate a mathematical model that behaves in a manner similar to (and in some cases identical to) the mechanical, electrical, and hydraulic components of the physical pumping station. For example, sensor data relating to the number and type of pumps present in the physical pumping station, the speed and position of valves in the pumping station, and water levels for the pumping station can be used to generate the model. In some implementations, the model can be adjusted over time as new sensor data becomes available. For example, machine learning techniques can be applied to new sensor data to generate an improved digital model that more accurately mimics the physical pumping station over time.

In some implementations, the characteristics of the model can be used along with one or more non-linear programming constrained optimization algorithms, such as a generalized reduced gradient algorithm or evolutionary programming, to provide settings for an operator of the pumping station to improve the performance of the pumping station. Constraints taken into account by such techniques can include pump runtime, groundwater withdrawal limits, a desired motor load, a desired maximum speed or frequency at which pump combinations may change, a number of pump starts and stops per day, a lower speed limit or valve level, and a minimum tank level. Based on these constraints, the model can serve as a real-time advisor to the pumping station operator by providing the equipment settings that most efficiently accomplish the requirements of the pumping station subject to the constraints. Thus, the model can provide a "best recipe" of settings based on the existing pump design and system operation for various discharge flow and discharge pressure combinations. In the example shown in FIG. 19, the model provides settings that can reduce the cost per million gallons from $77.5 to $62.8. In some implementations, the model may be used to optimize or improve one or more of a power output of the pumping station, an efficiency of the pumping station, a cost to operate the pumping stations (e.g., in dollars per million gallons), or a reliability of the equipment in the pumping station.

In some other implementations, the model may server as a historical advisor to provide insight into lost opportunity at the pumping station. For example, the model may be used to determine the optimal input settings over a previous time period (e.g., a day or a week), and may compare the actual pumping station performance to the performance that could have been achieved using the optimal settings.

FIGS. 20-23 illustrate example data generated via digital testing of a pumping station, according to an illustrative implementation. In general, the equipment in a pumping station, such as pumps, wells, and blowers, must be tested periodically to check their performance and schedule maintenance, and to ensure optimal performance. Typically, these types of tests are performed by maintenance personnel who must physically stop pumping operations in order to complete the tests. In some implementations, this process can be improved by performing digital tests using data retrieved from sensors in a pumping station while the pumping station continues to operate. For example, the real-time analytical data discussed above can be used to reduce the costs of physical testing, as the pumping station does not need to be stopped and maintenance personnel are not needed to perform physical testing.

Figure 20:
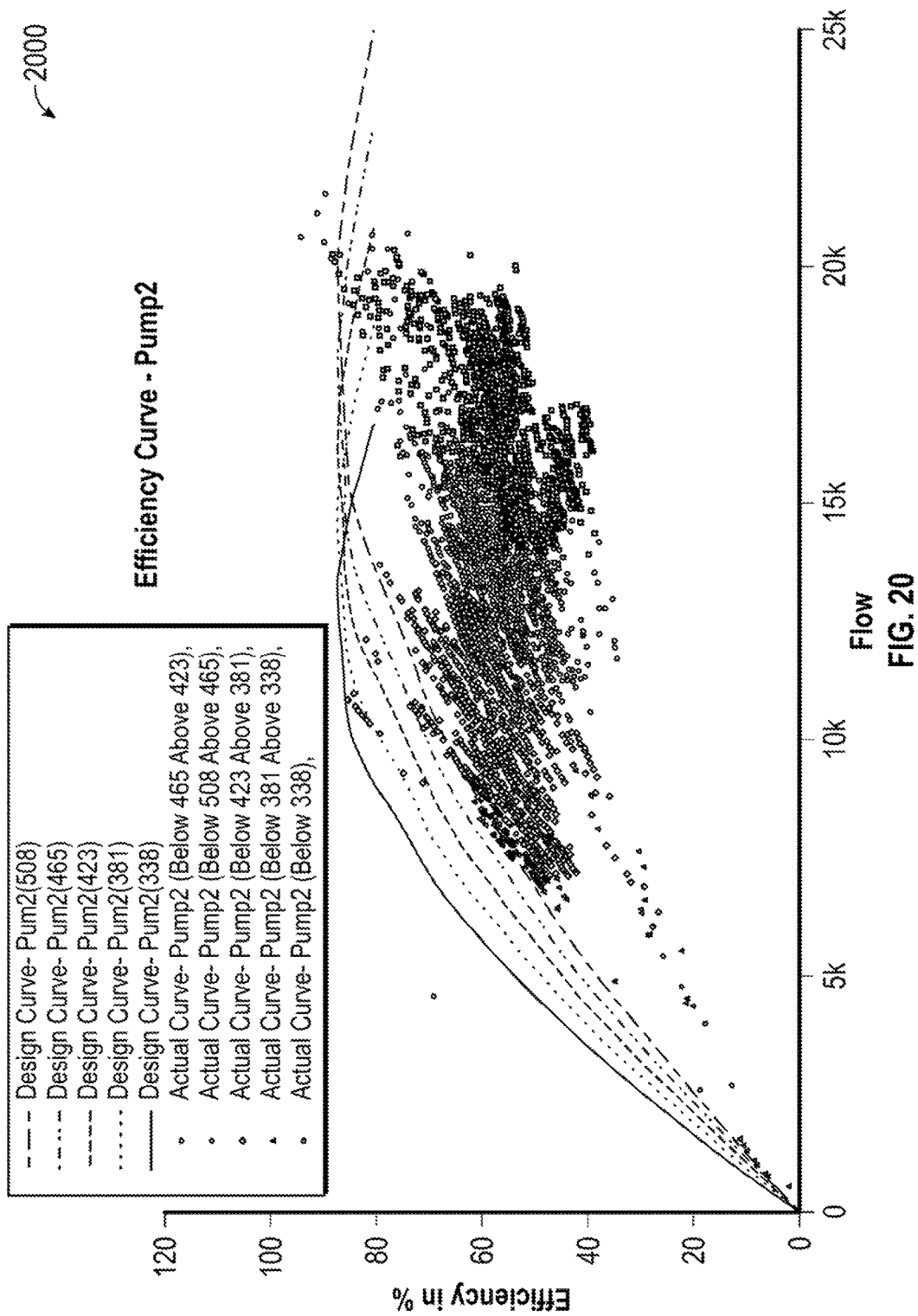
FIGS. 20-23 illustrate example data generated via digital testing of a pumping station, according to an illustrative implementation.
Figure 21:
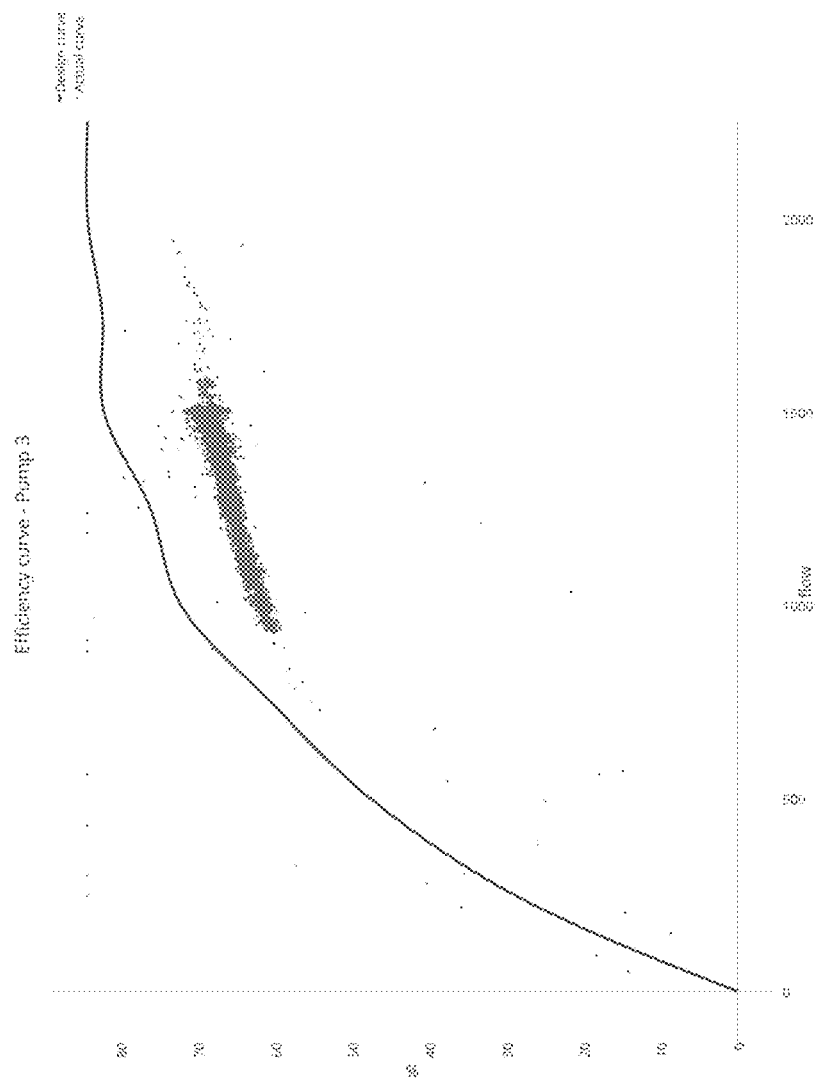
Figure 22:
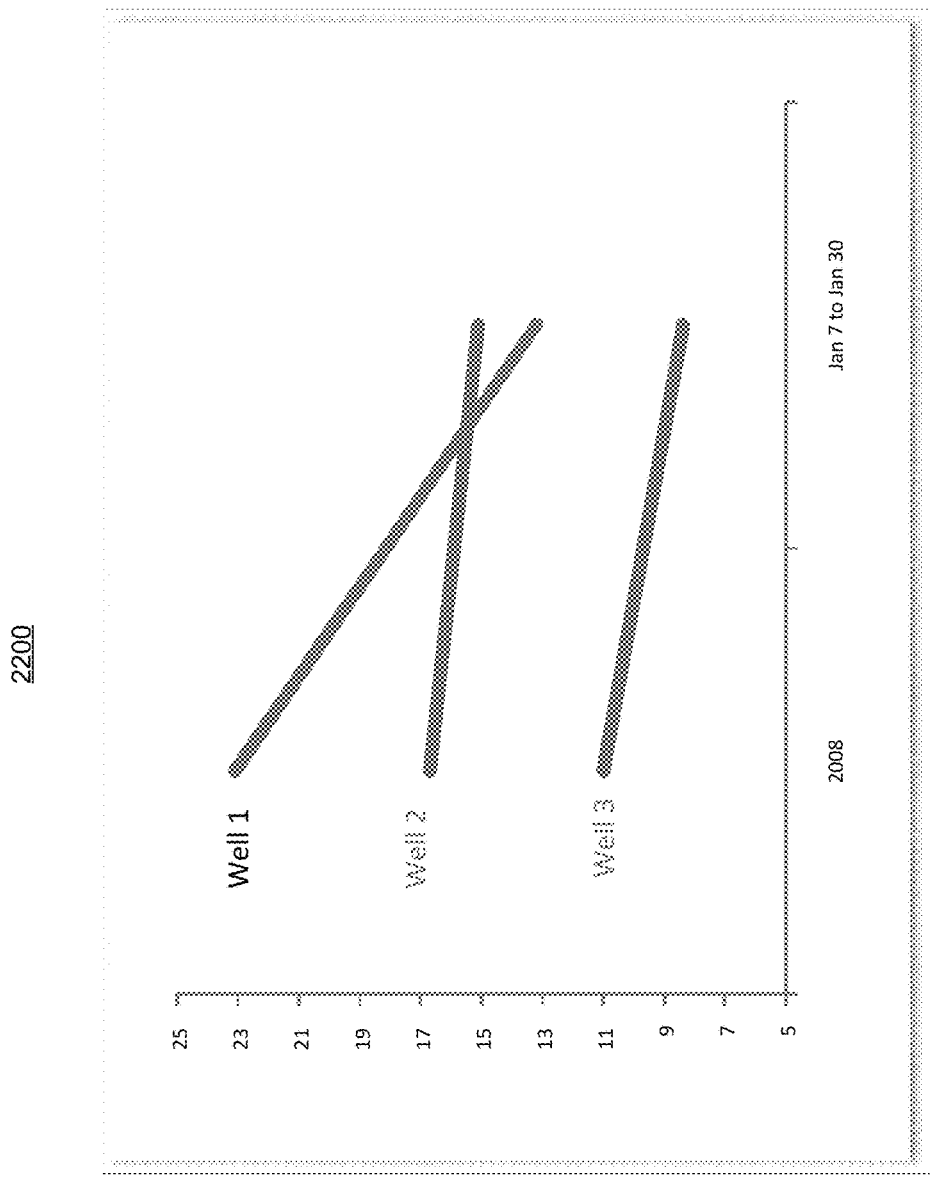
Figure 23:
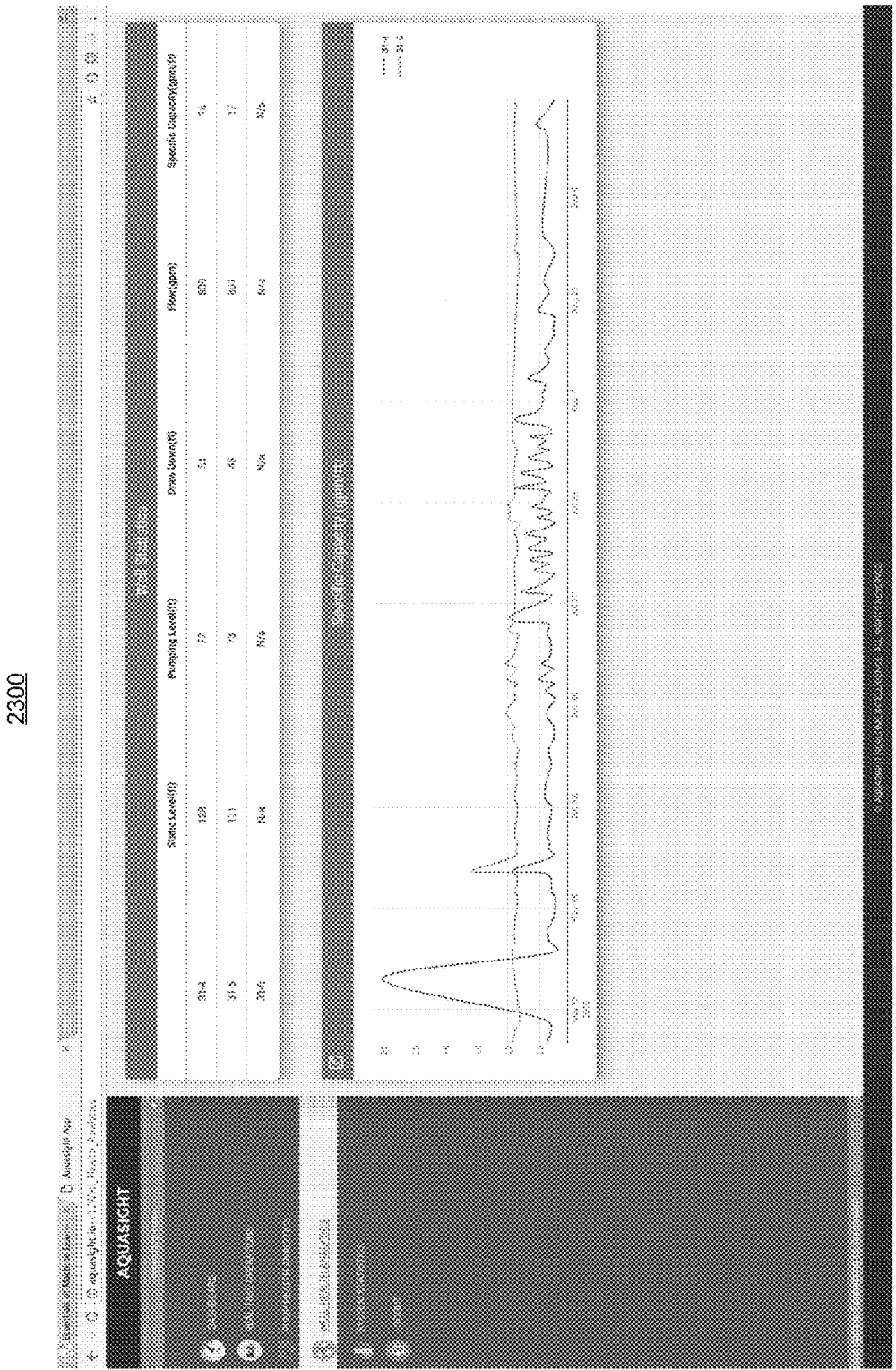

FIG. 20 shows a graph 2000 of efficiency curves for pumps operating at various speeds. This data can be obtained, as described above, without the need to stop the pumping station to perform a physical test. FIG. 21 shows a graph 2100 comparing the original design condition to actual operating points for efficiency at various flow rates. As shown, the actual operating points are clustered below the curve showing the original design condition. This may indicate that the pump for which this data was obtained is wearing out and should be replaced or repaired soon to increase its efficiency closer to its intended design efficiency. FIG. 22 shows a graph 2200 presenting the specific capacity of various wells over a period of time. As shown, each of the three wells exhibits decreased performance over time, but Well 1 experiences a sharper decline than either Well 2 or Well 3. This may indicate that Well 1 should be repaired or replaced soon in order to improve its specific capacity. FIG. 23 shows an interface 2300 for displaying various well statistics, such as static level, pumping level, draw down, flow, and specific capacity. The specific capacity over time for two of the wells is also shown as a line graph in the interface 2300.

As shown, the interface 2300 may be displayed in a web browser application. However, it should be noted that in other implementations, the interface 2300 may instead be displayed in a different type of application on any form of computing device, such as a smartphone, a tablet computing device, a laptop computing device, or a desktop computing device. In some implementations, the application that generates or displays the information presented in FIGS. 20-23 also may include other features. For example, in some implementations, an AQUASIGHT Expert feature may serve as a virtual on-line advisor. The AQUASIGHT Expert feature may provide guidance to a pumping station operator on process, equipment, efficiency, and new opportunities for better operation by accessing real-time pumping data. In some implementations, an AQUASIGHT Collaborative Platform feature may allow users (e.g., pumping station operators) to connect with one other to share knowledge and problem solving on mutual topics of interest.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations. For example, although the systems and methods described herein may be described generally with an agent and native contact application, these systems and methods may be implemented by an application, such as a non-native application or the native application itself. In one implementation, the native contact app may include any of the implementations of the agent described herein. In another implementation, the agent may provide the functionality of a contacts application (native or non-native) and update the agent's contact database instead of another application, such as the native contact application.

The phraseology and terminology used herein is for the purpose of description and should not be presses a button "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method for improving the performance of a water pumping station, comprising:
   receiving, by a server from a water utility plant, data from a plurality of sensors included within the water utility plant;
   cleansing, by the server, the data received from the water utility plant to generate cleansed data;
   preparing, by the server, the cleansed data for use by the water utility plant to generate plant-specific data; and
   generating, by the server, real-time analytic data based on the plant-specific data.

2. The method of claim 1, wherein the data received from the water utility plant relates to at least one of a voltage, a current, a power factor, a power, a motor speed, a discharge flow rate, a discharge pressure, and a water level associated with at least one piece of equipment included within the water utility plant.

3. The method of claim 1, wherein the data received from the water utility plant relates to at least one of a temperature, a viscosity, and a density associated with at least a portion of water processed by the water utility plant.

4. The method of claim 1, wherein the water utility plant comprises at least one of a waste water treatment facility, a potable water treatment facility, a well pump, and a desalination facility.

5. The method of claim 1, wherein generating the real-time analytic data further comprises generating, by the server, data relating to at least one of a well performance, an aquifer recharge rate, a pump run time, a well yield, a maintenance alert, and a safe pumping level, based on the plant-specific data.

6. The method of claim 1, wherein cleansing the data received from the water utility plant further comprises at least one of removing a sensor spike, detecting a plant shutdown, providing missing data, or eliminating a negative number.

7. The method of claim 1, further comprising displaying, by the server, the real-time analytic data on a display screen.

8. The method of claim 7, wherein displaying the real-time analytic data on a display screen further comprises:
   generating, by the server, a graph based on the real-time analytic data; and
   displaying, by the server, the graph on the display screen.

9. The method of claim 1, further comprising transmitting, by the server, the real-time analytic data to at least one of the water utility plant or a water utility headquarters.

10. A system for improving the performance of a water pumping station, comprising:
    a server comprising one or more hardware processors coupled with a memory, the server communicatively coupled to a water utility plant, wherein the one or more hardware processors of the server are programmed with instructions to:
    receive, from the water utility plant, data from a plurality of sensors included within the water utility plant;
    cleanse the data received from the water utility plant to generate cleansed data;
    prepare the cleansed data for use by the water utility plant to generate plant-specific data; and
    generate real-time analytic data based on the plant-specific data.

11. The system of claim 10, wherein the data received from the water utility plant relates to at least one of a voltage, a current, a power factor, a power, a motor speed, a discharge flow rate, a discharge pressure, and a water level associated with at least one piece of equipment included within the water utility plant.

12. The system of claim 10, wherein the data received from the water utility plant relates to at least one of a temperature, a viscosity, and a density associated with at least a portion of water processed by the water utility plant.

13. The system of claim 10, wherein the water utility plant comprises at least one of a waste water treatment facility, a potable water treatment facility, a well pump, and a desalination facility.

14. The system of claim 10, wherein the one or more hardware processors of the server are programmed with instructions to generate the real-time analytic data by generating data relating to at least one of a well performance, an aquifer recharge rate, a pump run time, a well yield, a maintenance alert, and a safe pumping level, based on the plant-specific data.

15. The system of claim 10, wherein the one or more hardware processors of the server are programmed with instructions to cleanse the data received from the water utility plant by at least one of removing a sensor spike, detecting a plant shutdown, providing missing data, or eliminating a negative number.

16. The system of claim 10, wherein the one or more hardware processors of the server are programmed with instructions to display the real-time analytic data on a display screen.

17. The system of claim 16, wherein the one or more hardware processors of the server are programmed with instructions to display the real-time analytic data on a display screen by:

generating a graph based on the real-time analytic data; and displaying the graph on the display screen.

18. The system of claim 10, wherein the one or more hardware processors of the server are programmed with instructions to transmit the real-time analytic data to at least one of the water utility plant or a water utility headquarters.

* * * * *